(12) United States Patent
Ryckman et al.

(10) Patent No.: US 12,352,568 B2
(45) Date of Patent: Jul. 8, 2025

(54) PHYSICAL UNCLONABLE FUNCTION FROM AN INTEGRATED PHOTONIC INTERFEROMETER

(71) Applicant: CLEMSON UNIVERSITY, Clemson, SC (US)

(72) Inventors: Judson D. Ryckman, Clemson, SC (US); Yingjie Lao, Clemson, SC (US); Farhan Bin-Tarik, Clemson, SC (US); Azadeh Gholamrezazadeh-Famili, Clemson, SC (US)

(73) Assignee: Clemson University Research Foundation, Clemson, SC (US)

( * ) Notice: Subject to any disclaimer, the term of this patent is extended or adjusted under 35 U.S.C. 154(b) by 720 days.

(21) Appl. No.: 17/354,314

(22) Filed: Jun. 22, 2021

(65) Prior Publication Data

US 2022/0069990 A1 Mar. 3, 2022

Related U.S. Application Data

(60) Provisional application No. 63/042,827, filed on Jun. 23, 2020.

(51) Int. Cl.
*G01B 9/02015* (2022.01)
*G01B 1/00* (2006.01)
(Continued)

(52) U.S. Cl.
CPC .......... *G01B 9/02015* (2013.01); *G01B 1/00* (2013.01); *G06F 21/75* (2013.01); *H04L 9/3278* (2013.01); *H04L 9/0866* (2013.01)

(58) Field of Classification Search
CPC .. G01B 9/02015; G01B 1/00; G01B 9/02051; H04L 9/0866; H04L 9/3278; G09C 1/00
See application file for complete search history.

(56) References Cited

U.S. PATENT DOCUMENTS

| | | | |
|---|---|---|---|
| 9,729,317 B2 * | 8/2017 | Pikus | H04L 9/0866 |
| 11,889,001 B2 * | 1/2024 | Smith | G02B 6/2935 |

(Continued)

OTHER PUBLICATIONS

Alharbi, et al. "Physically Unclonable Cryptographic Primitives by Chemical Vapor Deposition of Layered $MoS_2$" *ACS Nano* 11 (2017) pp. 12772-12779.

(Continued)

*Primary Examiner* — Violeta A Prieto
(74) *Attorney, Agent, or Firm* — DORITY & MANNING, P.A.

(57) ABSTRACT

Systems and methods of producing unclonable devices are disclosed. Robust optical physical unclonable function devices use disordered photonic integrated circuits. Optical physical unclonable functions based on speckle patterns, chaos, or 'strong' disorder are so far notoriously sensitive to probing and/or environmental variations. A presently disclosed optical physical unclonable function is designed for robustness against fluctuations in optical angular/spatial alignment, polarization, and temperature using an integrated quasicrystal interferometer which sensitively probes disorder. All modes are engineered to exhibit approximately the same confinement factor in the predominant thermo-optic medium (e.g., silicon) and for constraining the transverse spatial-mode and polarization degrees of freedom. Silicon photonic quasicrystal interferometry is used for secure hardware applications.

24 Claims, 23 Drawing Sheets

(51) Int. Cl.
*G06F 21/75* (2013.01)
*H04L 9/32* (2006.01)
*H04L 9/08* (2006.01)

(56) References Cited

U.S. PATENT DOCUMENTS

| | | | | |
|---|---|---|---|---|
| 2006/0216200 | A1* | 9/2006 | Nagatomo | G01N 21/4133 |
| | | | | 422/68.1 |
| 2015/0215115 | A1* | 7/2015 | Pikus | H04L 9/3278 |
| | | | | 380/30 |
| 2016/0245639 | A1* | 8/2016 | Mower | B82Y 20/00 |
| 2017/0268988 | A1* | 9/2017 | Swanson | G01S 7/4817 |
| 2018/0188418 | A1* | 7/2018 | Steinhardt | G02B 1/005 |
| 2018/0329962 | A1* | 11/2018 | Schrijen | H04L 9/3278 |
| 2019/0156066 | A1* | 5/2019 | Foster | G06F 21/72 |
| 2020/0304320 | A1* | 9/2020 | Smith | G02B 6/2935 |
| 2021/0194707 | A1* | 6/2021 | Aronson | H04L 9/0861 |
| 2022/0365927 | A1* | 11/2022 | Schrijen | G09C 1/00 |

OTHER PUBLICATIONS

Arppe, et al. "Physical unclonable functions generated through chemical methods for anti-counterfeiting" *Nat. Rev. Chem.* 1:31 (2017) pp. 1-13.
Atabaki, et al. "Integrating photonics with silicon nanoelectronics for the next generation of systems on a chip" *Nature* 556 (2018) pp. 349-354.
Berk, A. "Variational principles for electromagnetic resonators and waveguides" *IRE Trans. Ant. Propag.* 4 (1956) pp. 104-111.
Bhargava, et al. "Reliability enhancement of bi-stable PUFs in 65nm bulk CMOS" *Proc. IEEE Int'l Symp. HOST* (2012) pp. 1-6.
Bosworth, et al. "Unclonable photonic keys hardened against machine learning attacks" *APL Photonics* 5:10803 (2020) pp. 1-12.
Buchanan, et al. "'Fingerprinting' documents and packaging" *Nature* 436 (2005) p. 475.
Cao, et al. "CMOS image sensor based physical unclonable function for coherent sensor-level authentication" *IEEE Trans. Circ. Syst. I Reg. Pap.* (2015).
Cao, H. "Lasing in random media" *Waves Rand. Med.* 13 (2003) pp. R1-R39.
Chang, et al. "A Retrospective and a Look Forward: Fifteen Years of Physical Unclonable Function Advancement" *IEEE Circ. Syst. Mag.* 17 (2017) pp. 32-62.
Chen, et al. "Highly Secure Physically Unclonable Cryptographic Primitives Based on Interfacial Magnetic Anisotropy" *Nano Lett.* 18 (2018) pp. 7211-7216.
Chrostowski, et al. "Silicon Photonic Circuit Design Using Rapid Prototyping Foundry Process Design Kits" *IEEE J. Sel. Top. Quant. Elect.* 25 (2019) pp. 1-26.
Chui, C.K. "An introduction to wavelets" *Elsevier* (2016) pp. 1-363.
Davy, et al. "Selectively exciting quasi-normal modes in open disordered systems" *Nat. Comm.* 9:4714 (2018).
Di Falco, et al. "Perfect secrecy cryptography via mixing of chaotic waves in irreversible time-varying silicon chips" *Nat. Comm.* 10:5827 (2019).
Dingel, et al. "Multifunction optical filter with a Michelson-Gires-Tournois interferometer for wavelength-division-multiplexed network system applications" *Opt. Lett.* 23 (1998) pp. 1099-1101.
Dodda, et al. "Biological One-Way Functions for Secure Key Generation" *Adv. Theory Simul.* 2:1800154 (2019).
Du, et al. "Unclonable optical fiber identification based on Rayleigh backscattering signatures" *J. Lightwave Techn.* 35 (2017) pp. 4634-4640.
Dulkeith, et al. "Group index and group velocity dispersion in silicon-on-insulator photonic wires" *Opt. Expr.* 14 (2006) pp. 3853-3863.
Froggatt, et al. "Rayleigh backscattering signatures of optical fibers—Their properties and applications" *OFC/NFOEC* (2013) pp. 1-3.

Gassend, et al. "Silicon physical random functions" *Proc. ACM Conf. Comput. Comm. Secur.* (2002) pp. 148-160.
Ghulinyan, et al. "Light-pulse propagation in Fibonacci quasicrystals" *Phys. Rev. B* 71:094204 (2005) pp. 1-8.
Goorden, et al. "Quantum-secure authentication of a physical unclonable key" *Optica* 1 (2014) pp. 421-424.
Graps, A. "An Introduction to Wavelets" *IEEE Comput. Sci. Eng.* 2 (1995) pp. 50-61.
Grote, et al. "Integrated optical modulators and switches using coherent perfect loss" *Opt. Lett.* 38 (2013) pp. 3001-3004.
Grubel, et al. "Secure communications using nonlinear silicon photonic keys" *Opt. Expr.* 26 (2018) pp. 4710-4722.
Grubel, et al. "Light transport through ultrafast chaotic microcavities for photonic physical unclonable functions" *51st Ann. Conf. Inf. Sci. Syst. CISS* (2017) pp. 1-6.
Grubel, et al. "Silicon photonic physical unclonable function" *Opt. Expr.* 25 (2017) p. 12710-12721.
Helfmeier, et al. "Cloning physically unclonable functions" *IEEE Int'l Symp. HOST* (2013) pp. 1-6.
Herder, et al. "Physical unclonable functions and applications: A tutorial" *Proc. IEEE* 102 (2014) pp. 1126-1141.
Hu, et al. "Physically unclonable cryptographic primitives using self-assembled carbon nanotubes" *Nat. Nanotech.* 11 (2016) pp. 559-565.
Indeck, et al. "Fingerprinting Magnetic Media" *IEEE Trans. Magn.* 29 (1993) pp. 4095-4097.
Jones, et al. "Heterogeneously Integrated InP/Silicon Photonics: Fabricating Fully Functional Transceivers" *IEEE Nanotechn. Mag.* 13 (2019) pp. 17-26.
Kreger, et al. "High Resolution Distributed Strain or Temperature Measurements in Single-and Multi-mode Fiber Using Swept-Wavelength Interferometry" *Opt. Fiber Sens.* ThE42 (2006) pp. 1-4.
Lao, et al. "Reliable PUF-Based Local Authentication with Self-Correction" *IEEE Trans. Comput. Des. Integr. Circ. Syst.* 36 (2017) pp. 1-13.
Lao, et al. "Statistical analysis of MUX-based physical unclonable functions" *IEEE Trans. Comput. Des. Integr. Circ. Syst.* 33 (2014) pp. 649-662.
Levi, et al. "Disorder-Enhanced Transport in Photonic Quasicrystals" *Science* 332 (2011) pp. 1541-1544.
McGrath, et al. "A PUF taxonomy" *Appl. Phys. Rev.* 6:011303 (2019) pp. 1-25.
MacKenzie, L.E. "In vivo microvascular oximetry using multispectral imaging" *U. Glasgow* (2016) pp. 1-261.
Mesaritakis, et al. "Physical unclonable function based on a multimode optical waveguide" *Sci. Rep.* 8 (2018) pp. 1-12.
Nielsen, M. "On the construction and frequency localization of finite orthogonal quadrature filters" *J. Approx. Theory* 108 (2001) pp. 36-52.
Pappu, et al. "Physical one-way functions" *Science* 297 (2002) pp. 2026-2030.
Pétrie, et al. "A noise-based IC random number generator for applications in cryptography" *IEEE Trans. Circ. Syst. I* 47 (2000) pp. 615-621.
Phinyomark, et al. "Application of wavelet analysis in EMG feature extraction for pattern classification" *Meas. Sci. Rev.* 11 (2011) pp. 45-52.
Prabhu, et al. "Extracting device fingerprints from flash memory by exploiting physical variations" *Lect. Notes Comp. Sci.* (2011) pp. 1-17.
Redding, et al. "Evanescently coupled multimode spiral spectrometer" *Optica* 3 (2016) pp. 956-962.
Redding, et al. "Compact spectrometer based on a disordered photonic chip" *Nat. Photo.* 7 (2013) pp. 746-751.
Roati, et al. "Anderson localization of a non-interacting Bose-Einstein condensate" *Nature* 453 (2008) 895-898.
Roberts, et al. "Using Quantum Confinement to Uniquely Identify Devices" *Sci. Rep.* 5 (2015) pp. 1-8.
Rührmair, et al. "Optical PUFs Reloaded" *IACR Crypt.* (2013) pp. 1-13.
Rührmair, et al. "PUF Modeling Attacks on Simulated and Silicon Data" *IEEE Trans. Inf. Foren. Secur.* 8 (2013) pp. 1876-1891.

(56) References Cited

OTHER PUBLICATIONS

Ryckman, J. D. "Random Coherent Perfect Absorption with 2D Atomic Materials Mediated by Anderson Localization" *ACS Photonics* 5 (2018) pp. 574-580.
Segev, et al. "Anderson localization of light" *Nat. Photo.* 7 (2013) pp. 197-204.
Simard, et al. "Integrated Bragg gratings in spiral waveguides" *Opt. Expr.* 21 (2013) pp. 8953-8963.
Smith, et al. "Plasmonic Nanoparticles as a Physically Unclonable Function for Responsive Anti-Counterfeit Nanofingerprints" *Adv. Funct. Mater.* 26 (2016) pp. 1315-1321.
Suh, et al. "Physical unclonable functions for device authentication and secret key generation" *Proc. Des. Auto. Conf.* (2007) pp. 1-6.
Tarik, et al. "Robust optical physical unclonable function using disordered photonic integrated circuits" *Nanophotonics* 9 (2020) pp. 2817-2828.
Torrence, et al. "A Practical Guide to Wavelet Analysis" *Bull. Am. Meteor. Soc.* 79 (1998) pp. 61-78.
Troparevsky, et al. "Transfer-matrix formalism for the calculation of optical response in multilayer systems: from coherent to incoherent interference" *Opt. Expr.* 18 (2010) pp. 24715-24721.
Uchida, et al. "Fast physical random bit generation with chaotic semiconductor lasers" *Nat. Photo.* 2 (2008) pp. 728-732.
Vanneste, et al. "Lasing with resonant feedback in weakly scattering random systems" *Phys. Rev. Lett.* 98:143902 (2007) pp. 1-4.
Wang, et al. "Focusing sub-wavelength grating couplers with low back reflections for rapid prototyping of silicon photonic circuits" *Opt. Expr.* 22 (2014) pp. 20652-20662.
Wang, et al. "Backscattering in monomode periodic waveguides" *Phys. Rev. B* 78:245108 (2008) pp. 1-8.
Wiersma, D.S. "The physics and applications of random lasers" *Nat. Phys.* 4 (2008) pp. 359-367.
Wiersma, D. "The smallest random laser" *Nature* 406 (2000) pp. 133-135.
Xu, et al. "Mathematical Modeling Analysis of Strong Physical Unclonable Functions" *IEEE Trans. Comp. Des. Integr. Circuits Syst. I* 39 (2020) pp. 4426-4438. (Abstract only).
Yang, et al. "A physically unclonable function with BER <10-8 for robust chip authentication using oscillator collapse in 40nm CMOS" *IEEE Int'l Solid-State Circ. Conf.* 14.2 (2015) pp. 254-256.
Yin, et al. "Temperature-aware cooperative ring oscillator PUF" *IEEE Int'l Workshop HOST* (2009) pp. 36-42.

* cited by examiner

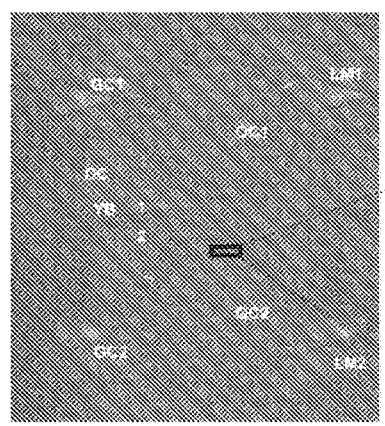
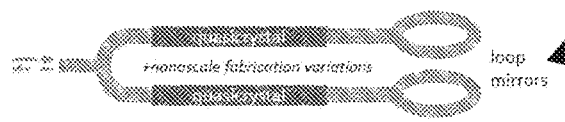
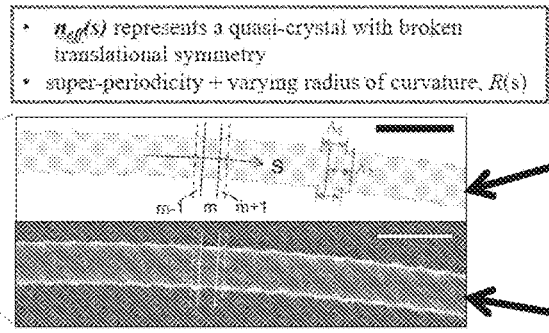
FIG. 2I
FIG. 2B
FIG. 2C
FIG. 2A
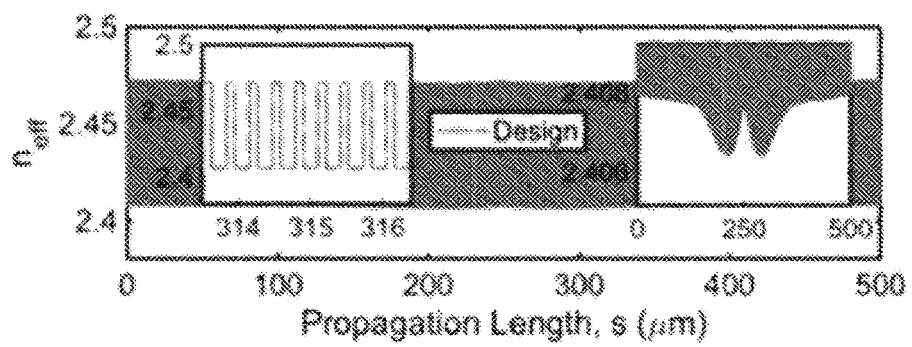
FIG. 2D

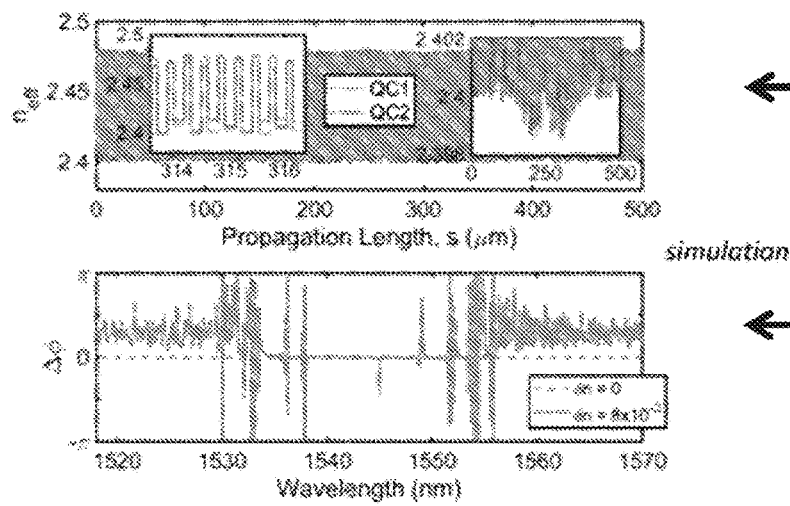
FIG. 2E
*simulation*
FIG. 2F
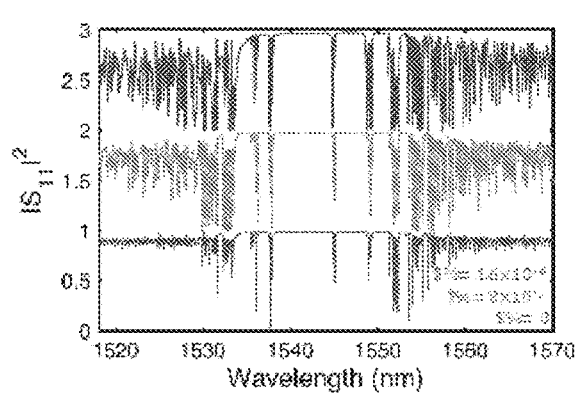
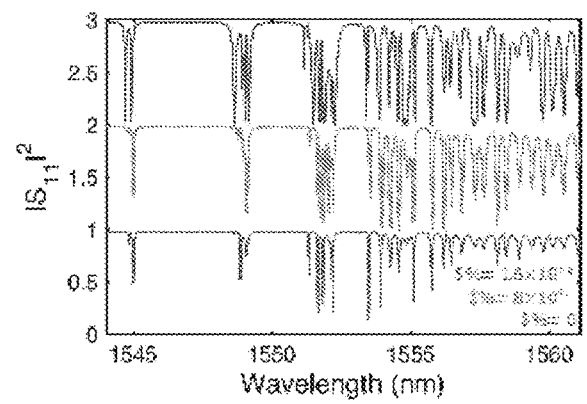
FIG. 2G  FIG. 2H

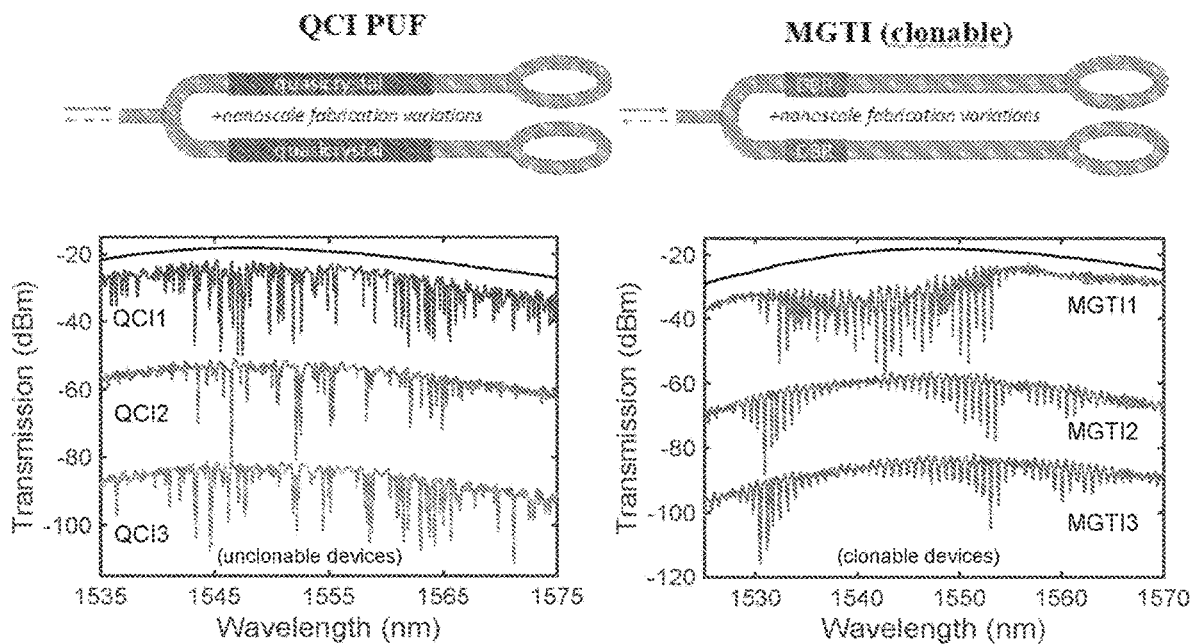
FIG. 3A  FIG. 3B
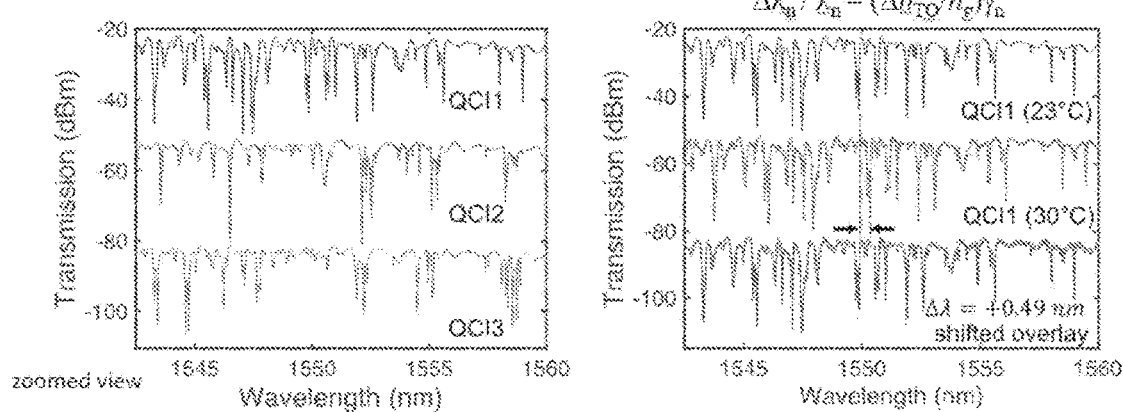
FIG. 3C  FIG. 3D

| Device | Setting | Lock 1 | Lock 2 | Lock 3 | Lock 4 | Lock 5 |
|---|---|---|---|---|---|---|
| QCI1 | 1 (23°C) | 0.21 | 1.66 | 7.79 | 30.17 | 119.92 |
| QCI1 | 2 (30°C) | 0.25 | 1.53 | 7.98 | 30.07 | 106.47 |
| QCI2 | 1 (23°C) | 0.14 | 0.73 | 3.98 | 14.26 | 26.16 |
| QCI2 | 2 (30°C) | 0.10 | 0.84 | 3.57 | 13.30 | 32.24 |
| QCI3 | 1 (23°C) | 0.23 | 1.33 | 6.34 | 24.81 | 68.93 |
| QCI3 | 2 (30°C) | 0.24 | 1.36 | 6.20 | 24.00 | 54.79 |

FIG. 5B

| Device | Unclonable | | | | | | Clonable | | | | | |
|---|---|---|---|---|---|---|---|---|---|---|---|---|
| | QCI1 | | QCI2 | | QCI3 | | MGTJ 1 | | MGTJ 2 | | MGTJ 3 | |
| Setting | 1 | 2 | 1 | 2 | 1 | 2 | 1 | 2 | 1 | 2 | 1 | 2 |
| Variance_fk ($\times 10^2$) | 1.6 | 1.16 | 0.01 | | 0.3 | 0.1 | 2.41 | 1.8 | 0.01 | −0.00 | 0.2 | |
| Variance_rbio ($\times 10^3$) | 0.8 | 1.59 | 0 | Enrolled | 0.1 | 0.2 | 0.41 | 0.4 | 1 | 0.76 | 0.5 | Enrolled |
| Variance_sym ($\times 10^3$) | 1.5 | 2.04 | 0.01 | | 0.2 | 0.3 | 0.96 | 2.1 | 1.1 | 0.63 | 0.4 | |
| Correlation | 0.8 | 0.76 | 0.96 | | 0.7 | 0.7 | 0.65 | 0.7 | 0.78 | 0.84 | 0.8 | |

Successful device identification in all cases

Device is not sufficiently unique and is mis-identified by various techniques

FIG. 5C

MGTI

Fabricated MGTI SEM

*Simulation: Stable random signature deterministically shifted/stretched*

*Simple Hamming authentication assuming a pure bit shift*

| Device | Setting | Level1 | Level2 | Level3 | Level4 | Level5 |
|---|---|---|---|---|---|---|
| "sim1" | 0 C | 0.20 | 0.94 | 3.64 | 14.88 | 34.35 |
| | 30 C | 0.16 | 0.74 | 2.88 | 15.88 | 21.48 |
| | -30 C | 0.20 | 0.75 | 4.64 | 8.040 | 42.89 |

FIG. 9A

| Device | "sim1" | | |
|---|---|---|---|
| Setting | -30 | 0 | +30 |
| Variance_fk ($\times 10^3$) | 0.1 | 0.03 | Enrolled |
| Variance_rbio ($\times 10^3$) | 0.02 | 0.00 | |
| Variance_sym ($\times 10^3$) | 0.05 | 0.00 | |

FIG. 9B

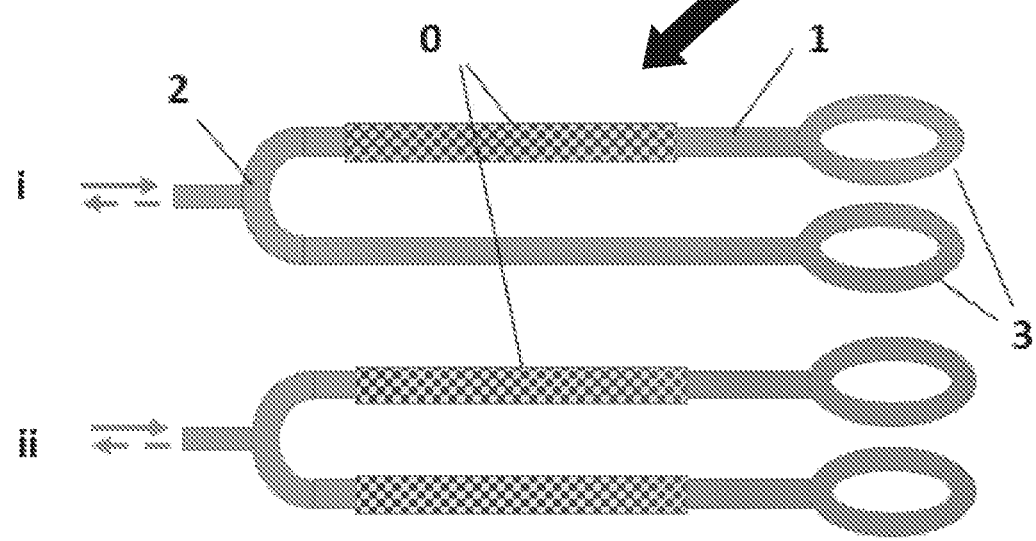
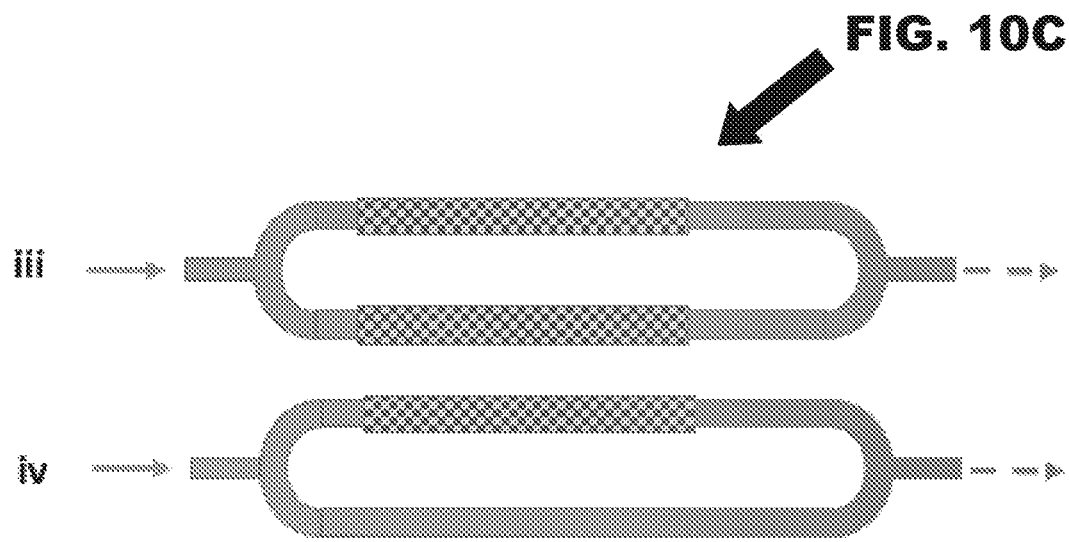

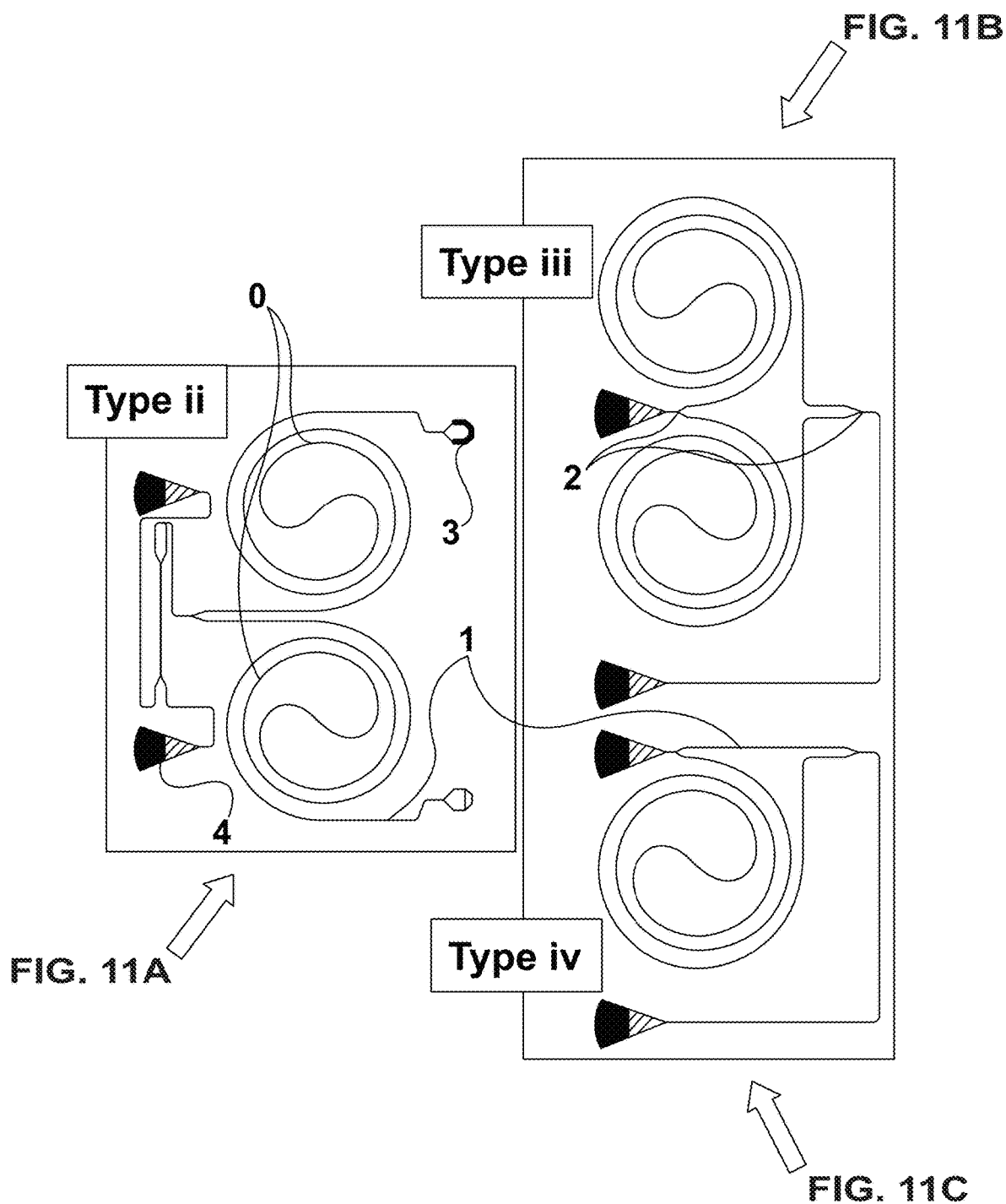

PHYSICAL UNCLONABLE FUNCTION FROM AN INTEGRATED PHOTONIC INTERFEROMETER

PRIORITY CLAIM

The present application claims the benefit of priority of U.S. Provisional Patent Application No. 63/042,827, titled Physical Unclonable Function from an Integrated Photonic Interferometer, filed Jun. 23, 2020, which is incorporated herein by reference for all purposes.

GOVERNMENT SUPPORT CLAUSE

This invention was made with Government support under Grant No. FA9550-19-1-0057, awarded by the Air Force Office of Scientific Research (AFOSR). The Government has certain rights in the invention.

FIELD

The present disclosure relates generally to optical physical unclonable function (PUF) devices comprising optics-enabled hardware for information security devices. More particularly, the present subject matter relates to optical PUF devices using an integrated quasicrystal interferometer (QCI) which achieves an unclonable device signature.

BACKGROUND

Security is rapidly becoming a critical factor for modern systems and devices, due to their increasingly embedded, distributed, unsupervised, and physically exposed nature. To this end, PUF has emerged as a promising security primitive that exploits intrinsic physical characteristics of devices. Optical PUFs are especially advantageous owing to the large data capacity and wave-dominated nature of photonic devices which further provides enhanced signature complexity and passive operation. However, optical PUFs based on free-space or fiber optic speckle patterns require 2D imaging and are exquisitely sensitive to errors in optical spatial/angular alignment, wavelength, and polarization. Integrated photonic PUFs have the potential to mitigate all these issues while further complementing the security of modern optical communication systems, but have so far been realized only in chaotic microcavities and lasers which are inherently very sensitive to their initial conditions, including temperature and power.

SUMMARY

Aspects and advantages of embodiments of the present disclosure will be set forth in part in the following description, or may be learned from the description, or may be learned through practice of the embodiments.

The subject matter relates to hardware security, information security, PUF, optical, network, cryptographic primitive, and disorder.

In general, it is a present object to provide improved hardware security and information security.

More specifically, it is an object of the presently disclosed subject matter to achieve robust optical physical unclonable functionality using disordered photonic integrated circuits.

Systems and methods of producing unclonable devices are disclosed. Robust optical PUF devices use disordered photonic integrated circuits. A presently disclosed optical PUF is designed for robustness against fluctuations in optical angular/spatial alignment, polarization, and temperature, using an integrated QCI which sensitively probes disorder. All modes are engineered to exhibit approximately the same confinement factor in the predominant thermo-optic medium (e.g., silicon), and for constraining the transverse spatial-mode and polarization degrees of freedom. Silicon photonic QCI is used for secure hardware applications.

Here, we introduce and experimentally demonstrate an integrated silicon photonic PUF based on a multiple scattering interferometer (MSI) made with standard single-mode silicon photonic components operating in the near infrared. Cryptographic keys with >8,000 bits are generated from the frequency response and used to demonstrate device authentication at multiple temperatures, while feature extraction and signature analysis are demonstrated as a viable and computationally efficient means for device identification. Our work builds upon the promise of optical PUF technology and opens the door to new avenues for opto-electronic hardware and information security.

In this work, we introduce and demonstrate a fully integrated MSI as a means for realizing a robust PUF. Similar to the original vision of the first optical scattering PUFs, our device probes spatially distributed randomness but realizes it in a highly integrated fashion which is designed to be inherently stable against probing and environmental variations. Unlike devices based on chaos, which are extremely sensitive to all conditions, or single-mode optical backscatter which is environmentally stable but extremely weak, the signatures of our device are highly visible, random, and environmentally stable. As a result, our PUF architecture is fully compatible with automated wafer-scale measurement techniques and fosters direct integration within silicon photonic transceivers or monolithic microprocessors as an optical hardware security layer. In the future, we envision opportunities to further enhance the functionality of such PUFs by leveraging active devices, reconfigurability, or quantum optics to realize entirely new levels of hardware and information security.

Our approach is arguably the most compelling demonstration of an optical PUF to date as it's the first to achieve true integration and demonstrate stability over temperature. It addresses many key problems with conventional optical PUFs and fosters new applications, such as integration into silicon photonics transceivers or electronic photonic microprocessors. The critical unique elements are as follows: (1) integrates photonic form factor (does not have to be silicon, could be silicon nitride or other); (2) uses single-mode (not multimode) waveguides in primary aspects of the structure; (3) uses a high sensitivity resonator and/or interferometer configuration which importantly has approximately uniform optical confinement factors with the waveguide core; this ensures all features are perturbed approximately at the same rate with respect to thermal/environmental variations and ensures the device signature is stable and identifiable over a variety of environmental conditions. Note: Chaotic resonator alternatives are generally sensitive to everything and there is no guarantee their signatures will be stable over environmental conditions. Highly multimode structures generally have many transverse modes which also have variable confinement factors, rendering them sensitive to environmental conditions. Note: Our structure supports many longitudinal resonant modes but only a single transverse mode. The features of the structure are achieved by small modulations on a waveguide and not dramatic features such as air holes or photonic crystals which would yield variable confinement factors; and (4) demonstrates feature extraction and correlation analysis to be promising and computationally efficient means for analyzing such devices.

Our approach provides the unique combination of highly visible, environmentally stable, easy to measure, and highly complex signatures required in PUF technology. This arguably realizes the so-far unrealized promise of using optics for PUF technology. Optics inherently has advantages over other electronic/chemical/physical PUFs; i.e., optical PUFs are especially advantageous owing to the large data capacity and wave-dominated nature of photonic devices which further provides enhanced signature complexity and passive operation.

Uses of the presently disclosed technology relate to hardware and information security applications. Such technologies are still emerging, while CMOS PUFs are more mature, optical approaches have the potential to disrupt this field.

PUF has emerged as a promising and important security primitive for use in modern systems and devices, due to their increasingly embedded, distributed, unsupervised, and physically exposed nature. However, optical PUFs based on speckle patterns, chaos, or 'strong' disorder are so far notoriously sensitive to probing and/or environmental variations. Here we disclose an optical PUF designed for robustness against fluctuations in optical angular/spatial alignment, polarization, and temperature. This is achieved using an integrated QCI which sensitively probes disorder while: (1) ensuring all modes are engineered to exhibit approximately the same confinement factor in the predominant thermo-optic medium (e.g., silicon), and (2) constraining the transverse spatial-mode and polarization degrees of freedom. This demonstration unveils a new means for amplifying and harnessing the effects of 'weak' disorder in photonics and is an important and enabling step toward new generations of optics-enabled hardware and information security devices.

We report the first optical physical unclonable function designed for robustness against fluctuations in optical angular/spatial alignment, polarization, and temperature, and introduce silicon photonic quasicrystal interferometry for secure hardware applications.

One exemplary embodiment of the presently disclosed subject matter relates to a security device, comprising optical hardware having an integrated MSI made with single-mode photonic components, forming an optical PUF device which has an unclonable device signature.

The presently disclosed subject matter equally relates to apparatus and to corresponding and/or related methodologies. One exemplary method of the presently disclosed subject matter relates to a method of producing unclonable devices for secure hardware and information security applications, including providing a robust optical PUF device using disordered photonic integrated circuits wherein the propagating and resonant modes contributing to the device's spectral signature exhibit approximately uniform confinement factors with the predominant thermo-optic medium.

Another presently disclosed exemplary method embodiment relates to methodology for secure hardware and information security applications, comprising the steps of integrating a disordered QCI with a mode filter into a silicon chip surface, for forming an optical PUF device which has an unclonable device signature, which optical PUF device is a robust device providing immunity against probing and against environmental variations; and determining the identification of the optical PUF device based on its unclonable device signature.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended Figures, in which:

FIG. 2A illustrates an optical microscope image (and schematic representation) of integrated silicon photonic QCI PUF architecture in accordance with exemplary embodiments of presently disclosed subject matter;

FIG. 2B illustrates a zoomed in (enlarged) view of an indicated portion of the optical microscope image of the subject matter of application FIG. 2A, representing aspects of presently disclosed subject matter;

FIG. 2C illustrates an SEM image of the curved quasicrystal (QC) features and illustration of the $m^{th}$ segment considered in device modelling (scale bar=1 μm), relative to the subject matter of application FIG. 2A, representing aspects of presently disclosed subject matter;

FIG. 2D illustrates a nominal QC effective index profile @ 1550 nm, regarding presently disclosed subject matter;

FIG. 2E represents an example of effective index profiles with random errors introduced, regarding presently disclosed subject matter;

FIG. 2F represents corresponding phase differences between the two symmetric arms of the exemplary design of application FIG. 2A regarding presently disclosed subject matter;

FIG. 2G illustrates simulated QCI spectra (y-branch (YB) port reflectance) for nominal and random QCIs with varying disorder parameters, regarding presently disclosed subject matter;

FIG. 2H illustrates a zoomed in (enlarged) view of the FIG. 2G regarding presently disclosed subject matter, while FIG. 2I illustrates an isolated view of the spiral quasicrystal (QC) arms and loop mirrors (LM1/LM2) of the exemplary integrated silicon photonic QCI PUF architecture of FIG. 2A;

FIG. 3A illustrates experimental transmission spectra for triplicated silicon photonic, including showing the measured spectra of three triplicated integrated QCI PUFs (for example, as represented in application FIG. 2A);

FIG. 3B illustrates experimental transmission spectra for triplicated silicon photonic, including showing the measured spectra of three triplicated integrated single etalon distributed Bragg reflector (DBR) integrated etalon Michaelson Gires-Tournois interferometers (MGTIs), with the black curve corresponding to a single pass directional coupler (DC) transmission;

FIG. 3C illustrates a zoomed in (enlarged) view of a portion of the subject matter of application FIG. 3A, regarding QCI PUF spectra showing device uniqueness;

FIG. 3D illustrates a zoomed in (enlarged) view of QCI1 spectra at two respective temperature settings, revealing a deterministic spectral shift for the subject matter of application FIG. 3A;

FIG. 5B illustrates a table of exemplary PUF features extracted from a five-level Fejer-Korovkin wavelet decomposition;

FIG. 5C illustrates a table of device identifications of presently disclosed QCI PUFs (re presently disclosed unclonable subject matter) versus existing clonable subject matter regarding MGTIs;

FIG. 9A illustrates a table of our application of the presently disclosed five level wavelet decomposition feature extraction method to the simulated PUF "sim1" spectra over temperature, with the table showing the resulting features and five-level wavelet analysis;

FIG. 9B illustrates a table of results for presently disclosed identification analysis in terms of mean squared error between the enrolled and test signals;

FIGS. 10A through 10F respectively illustrate diagrammatic overviews of exemplary embodiments of interferometer configurations for constructing integrated photonic PUFs in accordance with presently disclosed subject matter; and FIGS. 11A through 11D illustrate schematic exemplary embodiments of different types of integrated photonic interferometer PUFs in accordance with presently disclosed subject matter.

Figure 1A:
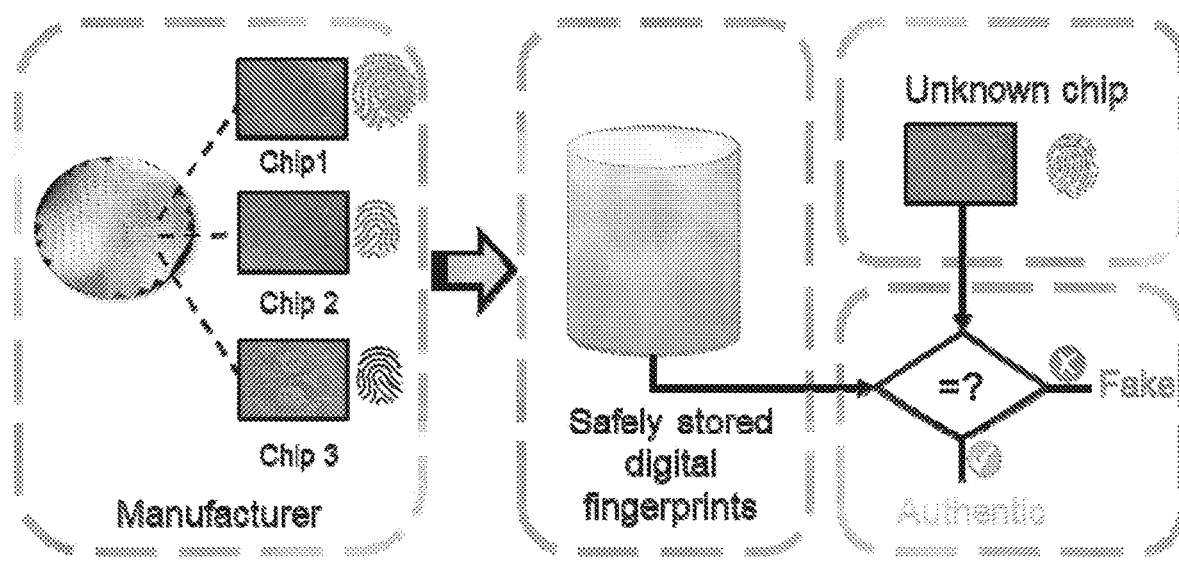
FIG. 1A depicts a high-level schematic overview of a typical (prior art) PUF device authentication scheme.

Repeat use of reference characters in the present specification and drawings is in some instances intended to represent the same or analogous features or elements or steps of the presently disclosed subject matter.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Disorder and entropy are pervasive characteristics of nature and can be harnessed by PUFs[1-4] or random number generators[5,6] to achieve significantly higher levels of hardware and/or information security than conventional methods. Manufacturing process variations are among the most technologically relevant forms of such randomness and are the primary means by which PUFs extract their chip-unique signatures[1-3,7-9]. Recently, classical time-varying PUFs have been applied in secure communications[10] and in schemes obtaining perfect secrecy cryptography[11]. In another highly demanded application, PUFs have emerged as promising security primitives for authentication and identification throughout the untrusted supply chain, as illustrated in FIG. 1A.

Much of the technological progress in PUFs over the last fifteen plus years has come in complementary metal oxide semiconductor (CMOS) micro- and nanoelectronics[12-16]. However, interest in developing PUFs for hardware and information security applications has recently rapidly expanded to almost all areas of physical science including investigations based on chemical methods[17], quantum tunneling[18], disordered nanomaterials[19-21], magnetic media[22] and even biological species[23]. Attractively, the immense information capacity and rich physics of photonic systems offer the prospect of both passive or active security devices operating in classical and quantum regimes[1,24,25]. Moreover, highly complex and distributed multiple scattering optical systems with high fabrication sensitivities can be very difficult to model or trim. Thus, the question remains open as to whether emerging technology could enable successful physical or machine learning attacks on emerging optical PUFs[26], as has been demonstrated in specific types of non-optical silicon PUFs[27-29].

In general, a PUF should be close to truly random in nature across different devices (so-called 'inter-chip' variation), while operating in a robust manner over a wide range of environmental conditions (so-called 'intra-chip' variation). In the optical domain, speckle patterns are famous for their high complexity and uniqueness which arise from underlying photonic disorder, making them well suited for generating strong 'inter-chip' variation. However, as illustrated in FIG. 1B, speckle phenomena from conventionally disordered photonic devices is notoriously sensitive to probing and environmental variations. Thus, optical PUFs realized from laser speckle patterns suffer from high 'intra-chip' variation and are generally not robust nor widely considered to be a scalable technology as they require precisely controlled optical alignment, tilt, polarization, temperature, and stable 2D spatially resolved optical imaging to measure and verify[1,3,30]. To realize a robust and scalable PUF technology, it remains imperative to enhance 'inter-chip' variation while simultaneously minimizing 'intra-chip' variation. Hence, emphasis must be placed on obtaining signatures which are highly visible, easy to measure in scale, computationally efficient to analyze, and robust over a range of measurement and/or environmental conditions.

Figure 1B:
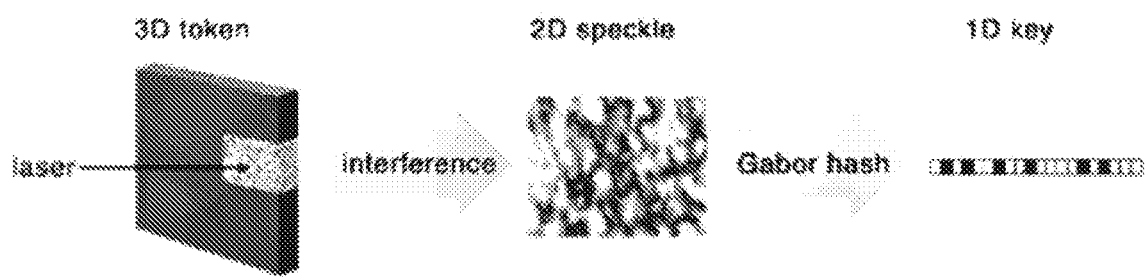
FIG. 1B represents speckle phenomena as used with conventional (prior art) disordered photonic devices.
Figure 1C:
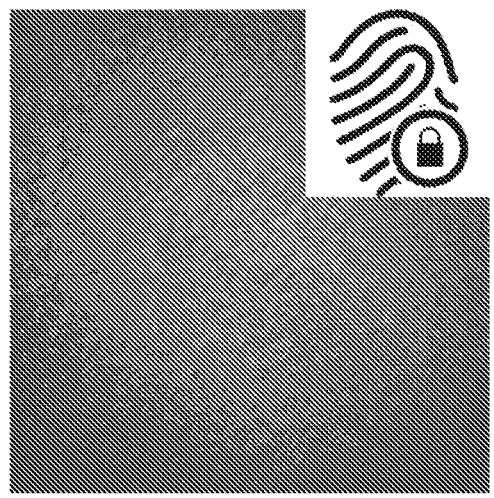
FIG. 1C represents prior art imagery regarding L. E. Mckenzie, "In vivo microvascular oximetry using multispectral imaging," 2016.
Figure 1D:
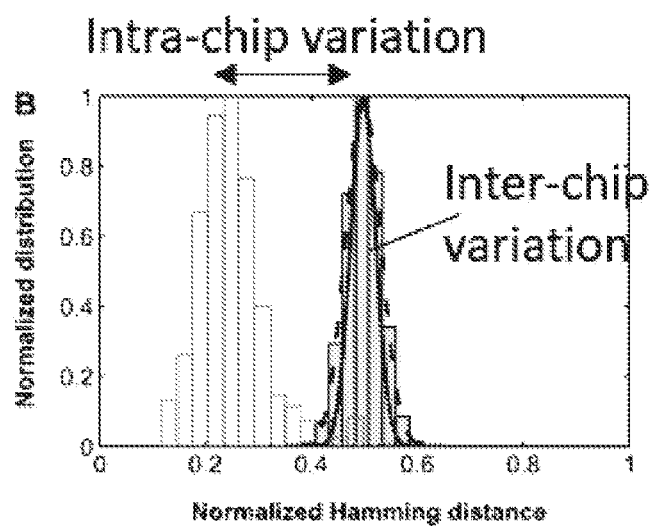
FIG. 1D represents normalized Hamming distance versus normalized distribution of inter-chip variation and intra-chip variation, as determined by Pappu, et al. *Science* 297.5589 (2002)
Figure 1E:
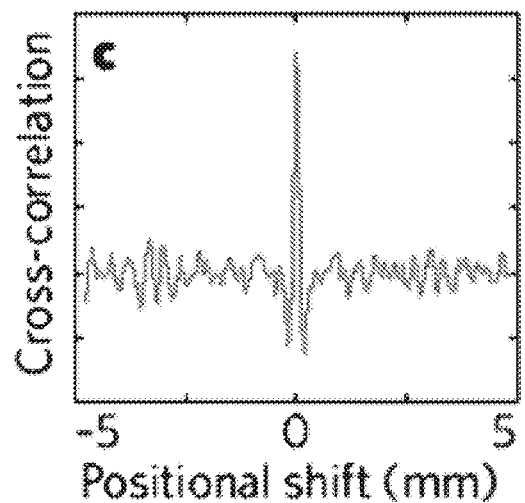
FIG. 1E represents positional shift versus cross-correlation, per Buchanan, et al., *Nature* 436.7050 (2005)
Figure 1F:
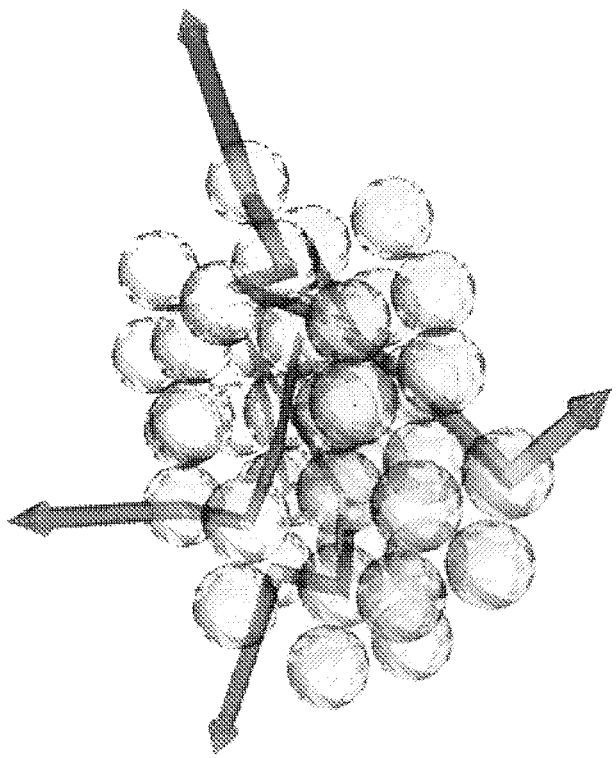
FIG. 1F represents scattering subject matter from Wiersma, D. *Nature Phys.* 4, 359-367 (2008)
Figure 1G:
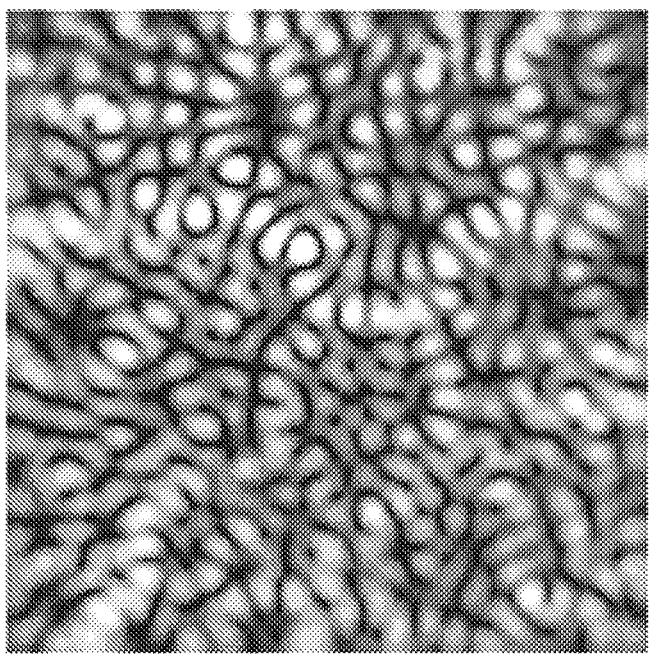
FIG. 1G represents scattering subject matter from Vanneste, et al. *Phys. Rev. Lett.* 98, 143902 (2007)
Figure 1H:
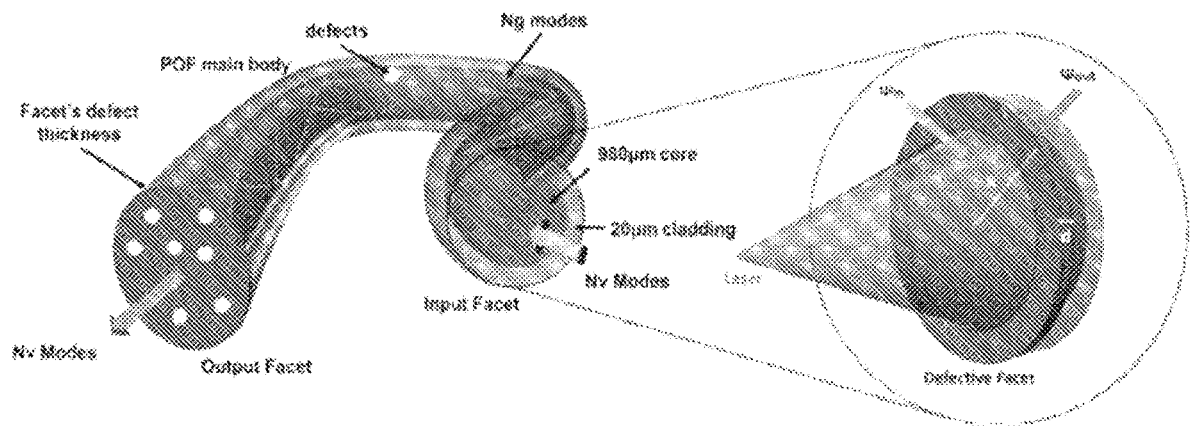
FIG. 1H represents multimode fiber speckle subject matter per Mesaritakis, et al. *Sci. Reports* 1-12 (2018)
Figure 1I:
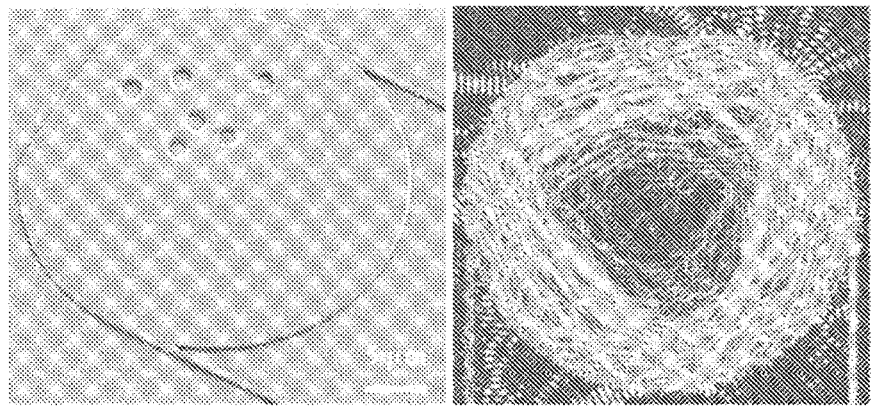
FIG. 1I represents subject matter per Grubel, et al. *Opt. Express* 26, 4710-4722 (2018)
Figures 1J, 1K:
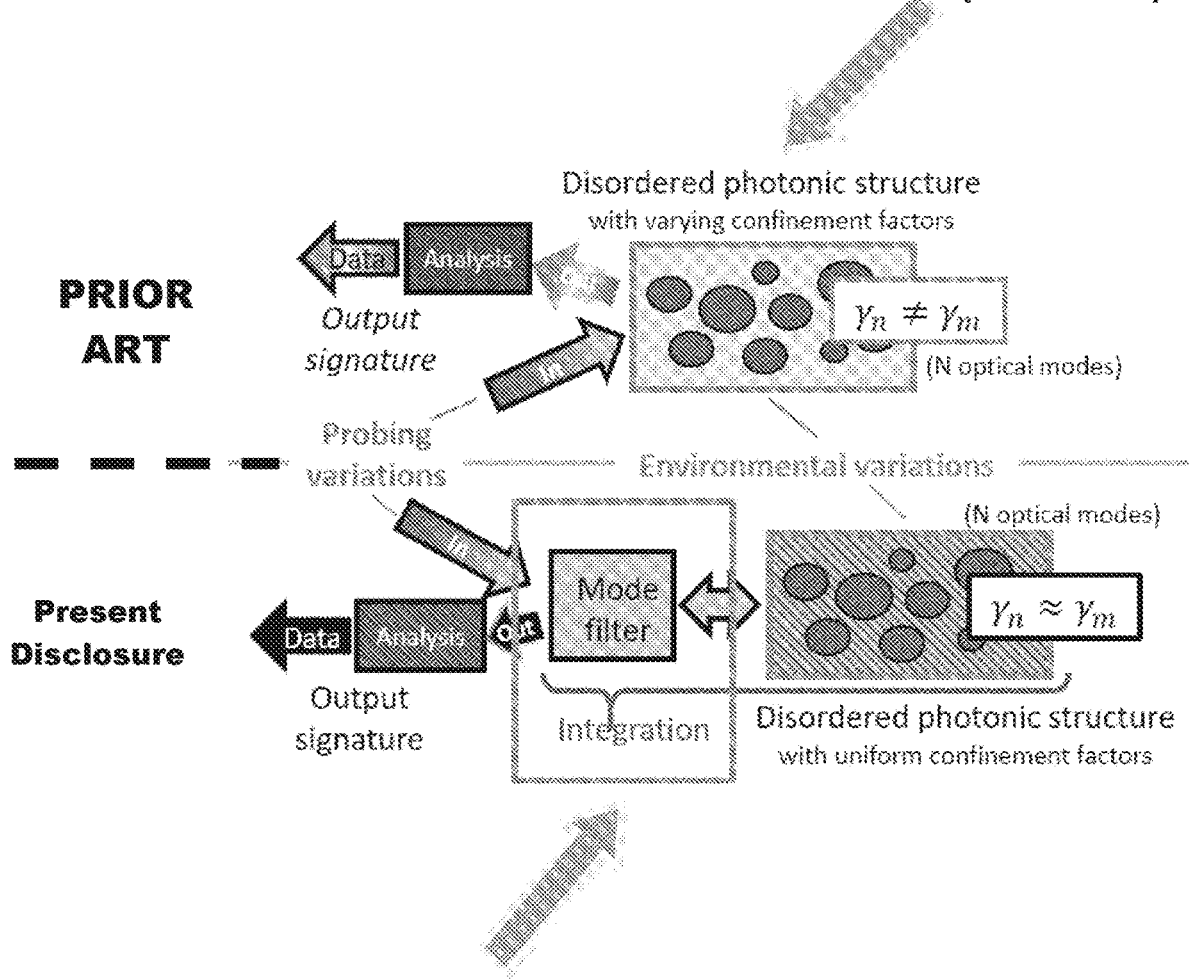
FIG. 1J depicts a high-level schematic overview of a typical (prior art) optical PUF device and associated methodology.
FIG. 1K depicts a high-level schematic overview of a robust optical PUF device and associated methodology in accordance with exemplary embodiments of presently disclosed subject matter.

FIGS. 1A, 1J, and 1K provide high-level overviews, with FIG. 1A illustrating a typical PUF authentication scheme, and FIG. 1J representing a conventional optical PUF, while FIG. 1K represents an overview of a presently disclosed robust optical PUF of the type introduced and disclosed in this disclosure. In this context, robustness refers to achieving immunity against probing and environmental variations.

Confining light in a waveguide on the surface of a chip is an alternative method of probing spatial randomness, and could be performed in a highly integrated fashion without imaging or discrete sampling of arrayed devices while storing an enormous amount of information in the frequency or impulse response. Along this vein, on-chip photonic PUFs have recently been investigated using chaotic optical microresonators[31,32]. The optical chaos effect relies on extreme sensitivity to initial conditions, which dramatically alters the near field speckle patterns formed from a large number of spatial modes with varying Q/V. However, these modes also generally exhibit variable modal confinement factors $|\gamma_n|$ (matter-light interaction) with the constituent optical media, where the confinement factor may be defined as:

$$|\gamma_n| = \frac{\int_{active} \in (\vec{r})|E_n(\vec{r})|^2 dV}{\int \in (\vec{r})|E_n(\vec{r})|^2 dV}.$$ Equation (1)

Hence, the various modes may be variably perturbed in frequency according to $\Delta\omega n/\omega n = -(\Delta n/ng)\gamma n$, where $\Delta n$ is the index perturbation and ng is the group index of the medium subject to perturbation. This renders such devices inherently very sensitive to all conditions, including both fabrication and environmental fluctuations such as temperature variations or non-linear effects[31-33]. On the other hand, Rayleigh backscatter from single-mode fiber or single-mode waveguide roughness naturally provides very stable and reliable random signatures. By supporting only a single-transverse mode with uniform confinement factor $|\gamma_n|$, the random frequency response of such devices does not 'evolve' but rather, is shifted deterministically in response to environmental stimuli such as temperature, strain, or aging[34,35] transmission. Addressing all of these issues is critical to unlocking the promise of PUF technology and advancing both classical and quantum hardware security. Moreover, as integrated photonics continues to scale and become more intimately intertwined with both CMOS[36] and high volume datacom applications[37], powerful new opportunities arise, such as the prospect for photonic security systems-on-a-chip or optical hardware-enabled encryption of communication links.

When it comes to physical hardware security, modern supply chains span the globe and expose devices to potential adversaries. The technical problem is to ensure a device (i.e., a chip) is authentic. The need is for unclonable device fingerprints.

The current technology utilizes digital fingerprint technique, where the chip information is stored and then compared later to other chips, to decide whether they are authentic or fake. However, this technique is not always accurate and such fingerprints can be easily cloned. For example, the technology to replicate your fingerprint is readily available at the grocery store. Moreover, complexity does not guarantee security. Right now, what is needed is unclonability.

Optics for hardware security may harvest entropy and use fabrication variations to create a random, unclonable device fingerprint or a physical unclonable (one-way) function (PUF). A PUF should be close to truly random in nature across different devices ('inter-chip' variation), while operating in a robust manner over a wide range of environmental conditions ('intra-chip' variation).

Optical speckle patterns (see FIG. 1B) are famous for their complexity and uniqueness. Here, entropy is harvested and fabrication variations create a random, unclonable device fingerprint, popularly known as PUF, which is, by name, a one-way function. Earlier, optical PUFs were proposed using light scattering off diffuse surfaces. In order to be close to truly random in nature, a proper PUF should have large inter-chip variation with low intra-chip variation.

FIG. 1C represents prior art imagery regarding L. E. Mckenzie, "In vivo microvascular oximetry using multispectral imaging," 2016. FIG. 1D represents normalized HD versus normalized distribution of inter-chip variation and intra-chip variation, as determined by Pappu, et al. *Science* 297.5589 (2002). FIG. 1E represents positional shift versus cross-correlation, per Buchanan, et al., *Nature* 436.7050 (2005).

Random multiple scattering is a consideration relative to optics for hardware security. FIG. 1F represents scattering subject matter from Wiersma, D. *Nature Phys.* 4, 359-367 (2008). FIG. 1G represents scattering subject matter from Vanneste, et al. *Phys. Rev. Lett.* 98, 143902 (2007).

FIG. 1H represents multimode fiber speckle subject matter per Mesaritakis, et al. *Sci. Reports* 1-12 (2018). FIG. 1I represents subject matter per Grubel, et al. *Opt. Express* 26, 4710-4722 (2018).

Random and disordered photonic systems are PUFs. The examples of FIGS. 1F and 1G show multiple scattering and a random laser near-field simulation. FIGS. 1H and 1I show more recent examples of intentionally creating PUFs using optics, with increasing levels of integration. In particular, FIG. 1H is an image of speckle patterns from multimode optical fiber, while FIG. 1I shows chaotic silicon microdisk resonators, extremely sensitive to fabrication variations, with the near field a sort of speckle pattern.

Even though multiple scattering, disordered, and chaotic optical systems are excellent for generating inter-chip variation, intra-chip variation remains highly sensitive to environmental variations, probing, polarization etc. So, we need a double-edged sword to overcome that. We need to establish a robust optical PUF which is immune to such variations.

In conventional technique and technology (such as represented by FIG. 1J), various modes in the system have varying confinement factors with the constituent materials. Such fact yields variable response to perturbations (e.g., temperature) and risks instability in fingerprint assessment. Consider, for example, if you were trying to use a fingerprint to open your phone, but the temperature had to be controlled to <0.25° C., or say the angle of the finger perfected to a fraction of a degree in order for the system to work. That is clearly not a practical device. Such shortcoming of the conventional technique needs to be addressed without sacrificing sensitivity to randomness, and the ability to generate strong intra-chip variation. Moreover, we want output signatures that are easy to measure (i.e., strong clear signal in transmission mode for example).

Here, we introduce and demonstrate a robust optical PUF constructed from silicon photonic circuitry, which can readily be interrogated from industry standard wafer-scale fiber-optic probing, and yields random, highly visible, and unclonable signatures with distinct features that are immune to probing and environmental variations. The robustness of our high-level approach, illustrated in FIG. 1K, is realized through the combination of several unique aspects. First, co-integration of a mode-filter and disordered photonic structure is employed to suppress the effect of probing variations. Second, we developed a photonic design which achieves very high sensitivity toward 'weak' perturbations, and in the photonic design, all modes exhibit approximately the same confinement factor in silicon ($|\bar{\gamma}_n \approx \gamma_m|$). This preserves the PUF's complex and non-deterministic signature in response to environmental thermo-optic variations as all spectral features shift together according to $\Delta\omega_n/\omega_n = -(\Delta n/n_g)\gamma_n$, where $\Delta n$ is the thermo-optic index change and $n_g$ is the group index of silicon. Last, we demonstrate application of feature extraction using wavelet analysis[38,39] to enable efficient and robust device authentication and identification. We also carry out conventional HD authentication of our PUFs in different settings and contrast our device with the random signatures of clonable (insecure) device designs manufactured in the same process.

Stated another way, our solution to the robustness problem consists of three high-level components: (1) On-chip integration of the disordered PUF with a mode filter (in our case we use single-mode waveguides and polarization filtering grating couplers); (2) Design of a high sensitivity photonic structure where the confinement factor of all modes with the constituent materials are approximately equal; and (3) Application of smart analysis techniques which extract the critical features of the device fingerprint, while mitigating any (minor) residual variations from probing/environmental variations.

Our integrated silicon photonic PUF is depicted in FIGS. 2A through 2H. Unlike free-space or multimode waveguide/fiber optical PUFs[1,3,30], our PUFs interface with disorder in a stable fashion (i.e., FIG. 1K) through a co-integrated mode filter consisting of transverse electric (TE) polarization grating couplers[40] and single-mode waveguides[41]. This design guarantees robust modal selectivity[42] and immunizes the devices against variations in polarization and spatial/angular alignment. The rest of the design is motivated to amplify the device's sensitivity to 'weak' disorder, while simultaneously suppressing the effect of environmental variations on device unique features. Here, we accomplish this through the introduction of a QCI with a weakly modulated index profile in a Michelson type configuration. Our QCI importantly breaks the translational symmetries exhibited in standard silicon photonic circuitry by using a multi-periodic grating with a slowly varying and non-uniform radius of curvature. This offers access to the unique physics and analyticity breaking offered by quasicrystals and 1D Aubry-André systems, including their distinct characteristics in response to disorder[43-46]. The weak index modulation meanwhile, ensures approximately constant or slowly varying confinement factor in silicon for all modes.

In our devices, fabrication variations are assumed to primarily stem from local nanoscale variations in waveguide width and surface roughness. To capture the effect of these variations with high sensitivity and visibility, and to not allow them to average out into very few parameters (as in a simple interferometer) or manifest as an ultimately very weak signal (as in waveguide Rayleigh backscatter), it is desirable to create a structure which supports multiple scattering through the use of many discrete waveguide segments. However, the arrangement of the segments should not have perfect translational symmetry as in a crystal or DBR. The properties of a DBR are generally very robust against weak perturbations such as nanoscale disorder owing to destructive interference, with only two narrow windows of enhanced sensitivity near the band edges. The use of linear DBRs instead of our spiral QCs would effectively make the device function like a symmetric single etalon MGTI[47]. Further, locally breaking the translational symmetry of a DBR in a limited number of locations would effectively yield photonic crystal cavities which only probe disorder in those discrete locations, thus severely limiting the device complexity. Hence, we observe that the use of a QC which entirely lacks translational symmetry (aside from allowed rotational symmetries) naturally arises as a powerful solution to sensitively probing spatially distributed fabrication variations while fostering enhanced complexity.

FIGS. 2A through 2I provide an overview of presently disclosed photonic circuitry and quasicrystal interferometry. In this work, we use a Michaelson configuration, similar to a MGTI, except the partial front mirrors are replaced with quasicrystals. FIG. 2A illustrates an optical microscope image of the integrated silicon photonic QCI PUF architecture. Input/output grating couplers (GC1/GC2), single-mode waveguides, and a 50:50 DC enable pure mode filtering and stable QCI device measurement in transmission. A compact y-branch (YB) splits light into two symmetric arms, (1) and (2), routed to the spiral quasicrystal (QC) arms and loop mirrors (LM1/LM2) (FIG. 2I). All such FIG. 2A architecture may be fabricated on standard 220 nm Si Photonics platform materials. FIG. 2B illustrates a zoomed in view of the subject design as indicated. FIG. 2C illustrates an SEM image of the curved QC and illustration of the $m^{th}$ segment considered in device modelling (scale bar=1 μm).

Thus, such embodiment relates to an Integrated QCI.

FIG. 2D illustrates a nominal QC effective index profile @ 1550 nm. Resonances and band edge effects are supported near 1550 nm thanks to the proper choice of periods. QC1 and QC2 $n_{eff}(s)$ designs are exactly the same. Benefits of a weakly modulated ('small') sidewall grating are that it ensures approximately uniform confinement factors for all modes and that it has a 'weak' nanoscaled disorder which yields strong perturbation to QC.

FIG. 2E represents an example of effective index profiles with random errors introduced. FIG. 2F represents corresponding phase differences between the two symmetric arms of the exemplary design.

We simulated randomized QCIs to illustrate device behavior. Whereas a perfectly fabricated device would exhibit no phase errors, the spatially distributed phase errors yield complex randomization in the phase difference spectra. FIG. 2G illustrates simulated QCI spectra (YB port reflectance) for nominal and random QCIs with varying disorder parameters. FIG. 2H illustrates a zoomed in view of a portion of the fuller wavelength view of the FIG. 2G subject matter.

The arms our QCI PUF consist of are width modulated (500 nm+/−20 nm) single-mode Si waveguides with nominal device thickness 220 nm cladded by $SiO_2$. The QCs each utilize a slowly varying radius of curvature spiral (R≈50-25 μm), containing 500 μm long multiperiod gratings formed by the superposition of gratings with periods $\Lambda1=316$ nm and $\Lambda2=317$ nm. Grating teeth (i.e., width equal to 520 nm) are placed at the intersection of $\Lambda1$ and $\Lambda2$ gratings by performing a Boolean AND function. When considered as a standalone component without disorder, the 1D QC forms longitudinal modes as a result of several effects, which are all related to breaking translational symmetry: (1) the low frequency band edge of the $\Lambda1$ grating forms a defect region within the overlapped band gap of the $\Lambda2$ grating; (2) the high frequency band edge of the $\Lambda2$ grating forms a defect region within the overlapped band gap of the $\Lambda1$ grating; and (3) additional defect modes are introduced owing to the weak gradual reduction of waveguide effective index with reducing radius of curvature[48]. The output of the QCs is routed to loop mirrors which offer broadband reflectivity and supports the formation of higher order resonances owing to multi-pass effects. The initial onset of disorder is expected to introduce unique extended states fostering slow-light and resonantly enhanced transmission through the QC in the vicinity of the overlapping fundamental band gaps, while increasing disorder strength should foster the introduction of random localized states and optical resonances exhibiting unique spatial and spectral characteristics. In principle, the exact device design that is used can be flexible, but should ideally provide the following traits: (1) offer high complexity and require numerical methods to model even qualitatively; (2) support the presence and formation of many spectrally and spatially isolated resonances; (3) support regions of slow-light effects or high dispersion; (4) be realized in a regime where fabrication variations constitute a non-negligible fraction of the critical dimensions; and (5) be comprised entirely of weakly modulated single transverse mode waveguides with approximately uniform confinement factors.

The predicted characteristics for QCIs with varying disorder, $\delta n \geq 0$, are shown in FIGS. 2D through 2H. The designed width and radius of curvature modulation of the spiral quasicrystal arms yields a nominal effective index profile vs. propagation length (FIG. 2D), which is then locally and randomly distorted owing to spatially distributed fabrication variations (i.e., FIG. 2E). To model the potential effect of such fabrication variations, we apply a uniformly distributed random error of no more than +/−5 nm in waveguide width, corresponding to a maximum effective index error in any segment of $\delta n=8\times10^{-3}$. These random fabrication variations are usually interpreted as 'weak' perturbations in the context of waveguide or photonic crystal backscatter[49], and are indeed weak in the sense that they do not significantly perturb the transverse optical confinement factor in silicon. However, in our device where the effective index modulation is intentionally small, $\Delta n \sim 6.5\times10^{-2}$, and where there is a lack of perfect translational symmetry, these 'weak' perturbations contribute significant disorder (i.e., >10% the effective index modulation of the unperturbed grating), both randomly perturbing existing states and introducing random extended and localized states into the spiral quasicrystal. This yields a highly complex and spectrally randomized phase difference between the arms (FIG. 2F), which can be converted into highly visible spectral fingerprints (FIGS. 2G and 2H) using the Michelson configuration.

In a balanced and lossless interferometer with no phase errors, the reflection spectrum detected from the YB should theoretically measure as 100% across the entire spectrum. In our devices however, the waveguides have a finite propagation loss (~2.4 dB/cm) owing to sidewall roughness and bend loss, as well as passive insertion loss at the interfaces to/from the quasicrystals and loop-mirror YBs. This loss is significantly enhanced in regions of optical resonance or band edges, becoming a form of coherent perfect loss when critically coupled to quasicrystal or higher order etalon modes[50,51], and provides distinct features in the spectrum even for a perfectly symmetric and balanced QCI with no disorder, $\delta n=0$. In effect, our QCI exploits randomization in both the amplitude and phase degrees of freedom to generate its unique signatures, while our photonic circuitry specifically constrains the transverse spatial-mode and polarization degrees of freedom to foster robustness.

Regarding environmental stability, it should be emphasized that thermo-optic stimuli can easily perturb a mode frequency $\omega_n$ by a magnitude $|\Delta\omega_n|$ much larger than its full-width half maximum and much larger than the nearest mode to mode frequency spacing—i.e., in general it's likely that in practice $|\Delta\omega_n| \gg \omega_{fwhm,n}$ and $|\Delta\omega_n| \gg |\omega_{n\pm1} - \omega_n|$. If an optical device has many resonant modes contributing features to its spectrum, then the optical spectrum will 'evolve' or be reconfigured to generate a different spectral fingerprint if the modal confinement factor in the thermo-optic medium, $\gamma_n$, is not a uniform or very slowly varying function of the mode frequency $\omega_n$. This can lead to extreme sensitivities to temperature, for example, in certain multi-mode speckle devices where 50% decorrelation in the output speckle pattern has been observed in response to temperature variations of 0.16° C.[52].

Unlike chaotic microcavity PUFs[31,32], multi-mode speckle devices[30,52], or strongly disordered photonic systems considered in other applications[43,53,54], all of the modes in the QCI are engineered to exhibit nearly the exact same confinement factor in silicon via the single transverse mode that is supported and narrow +/−20 nm waveguide width modulation that is utilized. This unique design ensures that thermo-optic effects fractionally perturb the frequency of all modes equally, thereby suppressing the effect of intra-chip variations and preserving the output device signature across temperature.

To experimentally demonstrate our devices, both QCI PUFs and single etalon DBR-integrated MGTI reference devices were fabricated in a standard 220 nm device layer SOI platform, as otherwise referenced herein. Devices were then measured with a tunable laser under TE polarization using the fiber-to-chip grating couplers as illustrated in FIG. 2A. The double pass insertion loss of the directional coupler used to probe the QCI sets the minimum on-chip insertion loss to ~6 dB, rendering the devices easy to measure and align to in an automated testing environment, while the single-mode waveguides and single polarization grating couplers render the devices immune to errors in spatial or angular alignment and polarization. To assess the impact of thermal/environmental variation, devices were measured at two temperature settings: 23° C. and 30° C. (settings were measured ~48 hours apart from one another). The +7° C. temperature variation mimics the effect of a significant temperature drift which is expected to shift the wavelength for most of the PUF's spectral features by significantly more than their 3 dB linewidth.

FIGS. 3A through 3D illustrate experimental transmission spectra for triplicated silicon photonic, including showing the measured spectra of three triplicated integrated QCI PUFs (e.g., FIG. 2), fabricated in the same process and located next to each other on the same die. The designs of the triplicate structures are all exactly the same with no modifications. However, their optical spectra are entirely unique, effectively serving as a fingerprint for each device. The devices exhibit excellent visibility in grating-coupled transmission, with extinction ratios well in the ~5-30 dB range.

We fabricated our QCI PUFs (FIG. 3A), as well as more conventional MGTI devices (FIG. 3B), which have significantly lower complexity. Each structure was fabricated in triplicate, with the exact same designs on the same chip. The device-to-device uniqueness arises entirely from natural fabrication variations. Our QCI PUFs show highly complex and randomized unique spectral fingerprints as desired. The MGTI devices are 'randomized' owing to distributed phase errors. However, randomness does not ensure unclonability. You can already see how close.

The DBR exhibits periodicity and is robust to nanoscale disorder, and the waveguides experience phase errors with limited complexity. As shown:
  Clonable devices show periodic/repetitive pattern and exhibit regions of continuous or periodic translational symmetry.
  In case of Unclonable devices, patterns never repeat, and they have no translational symmetry either.

In particular, FIG. 3A illustrates QCI PUFs. FIG. 3B illustrates single etalon DBR-integrated MGTIs, with the black curve corresponding to a single pass DC transmission. Probing of QCIs and MGTIs adds ~3 dB insertion loss owing to double pass loss through the DC. Device 2/3 spectra are shifted on the y-axis for clarity. FIG. 3C illustrates a zoomed in view of QCI PUF spectra showing device uniqueness. FIG. 3D illustrates a zoomed in view of QCI1 spectra at both temperature settings, revealing a deterministic spectral shift. The +7° C. temperature variation mimics the effect of a significant temperature drift which is expected to shift the wavelength for most of the PUF's spectral features by significantly more than their 3 dB linewidth. As the temperature is varied by +7° C., spectral fingerprint is perfectly retained and does not evolve thanks to uniform confinement factors exhibited by all modes, hence giving them the same thermo-optic shift.

In the same fabrication run, we also included triplicated single etalon MGTI designs wherein the spiral quasicrystals were replaced with a waveguide delay and simple DBR structure. The DBR length was ~23 μm with a sidewall grating width modulation of 500+/−80 nm. The waveguide path length from the YB to the DBR was ~280 μm and from the DBR to the loop mirror was ~340 μm. Although the MGTI spectra are 'randomized' by fabrication-induced phase errors, as visible by the difference in device-to-device spectrum variations from FIG. 3B, the device spectra are not unclonable. In the single etalon MGTI devices, an analytical description and exact parameter fit of the device properties could be achieved since the distributed fabrication variations are simply averaged into very few device parameters (i.e., 2 values of DBR K-L, and 4 values of optical path lengths, effective/group indices, and optical losses). Over many process runs or iterations, the likelihood of repeating the same MGTI device signature twice (i.e., cloning) becomes very significant despite the randomness imparted into each device. In the QCI PUF device however, the distributed fabrication variations are locally captured in each unique segment of the 1D multiple scattering waveguide, which exponentially increases the device complexity and exponentially suppresses the probability of cloning.

Assuming fabrication errors in a given segment could be simply discretized to five values (i.e., width deviation of +/−5 nm in increments of 2.5 nm), the number of device permutations in an MGTI structure with 4 segments is only on the order of $5^4 \approx 10^{2.8}$, whereas our finite length QCI device has >6,000 multiple scattering segments resulting in more than $5^{6000} \approx 10^{4193}$ possible unique physical device permutations. Hence, despite being qualitatively similar types of devices at an architectural level, the MGTI and QCI are exponentially different in terms of complexity.

FIG. 3D shows the transmission spectrum for an integrated QCI PUF measured at both temperature settings. All features in the spectral fingerprint of the device near 1550 nm are shifted in wavelength by $\Delta\lambda \approx +0.49$ nm, in excellent agreement with the predicted thermo-optic sensitivity of the single-transverse mode silicon waveguides. This provides an experimental measurement of the confinement factor in silicon, determined to be ~0.884, and confirms that all modes of the QCI exhibit approximately the same confinement factor. Crucially, this provides evidence that the non-deterministic inter-chip characteristics are preserved and deterministically perturbed by temperature, as desired. Simulations suggest this deterministic spectral response to temperature can be sustained for even larger temperature variations $\Delta T=\pm 30°$ C. However, if the modal confinement factors were not uniform, then randomized features corresponding to different modes would shift with different thermo-optic sensitivities and the spectrum would dynamically evolve in an unpredictable fashion rather than simply shifting in response to temperature.

Figure 4A:
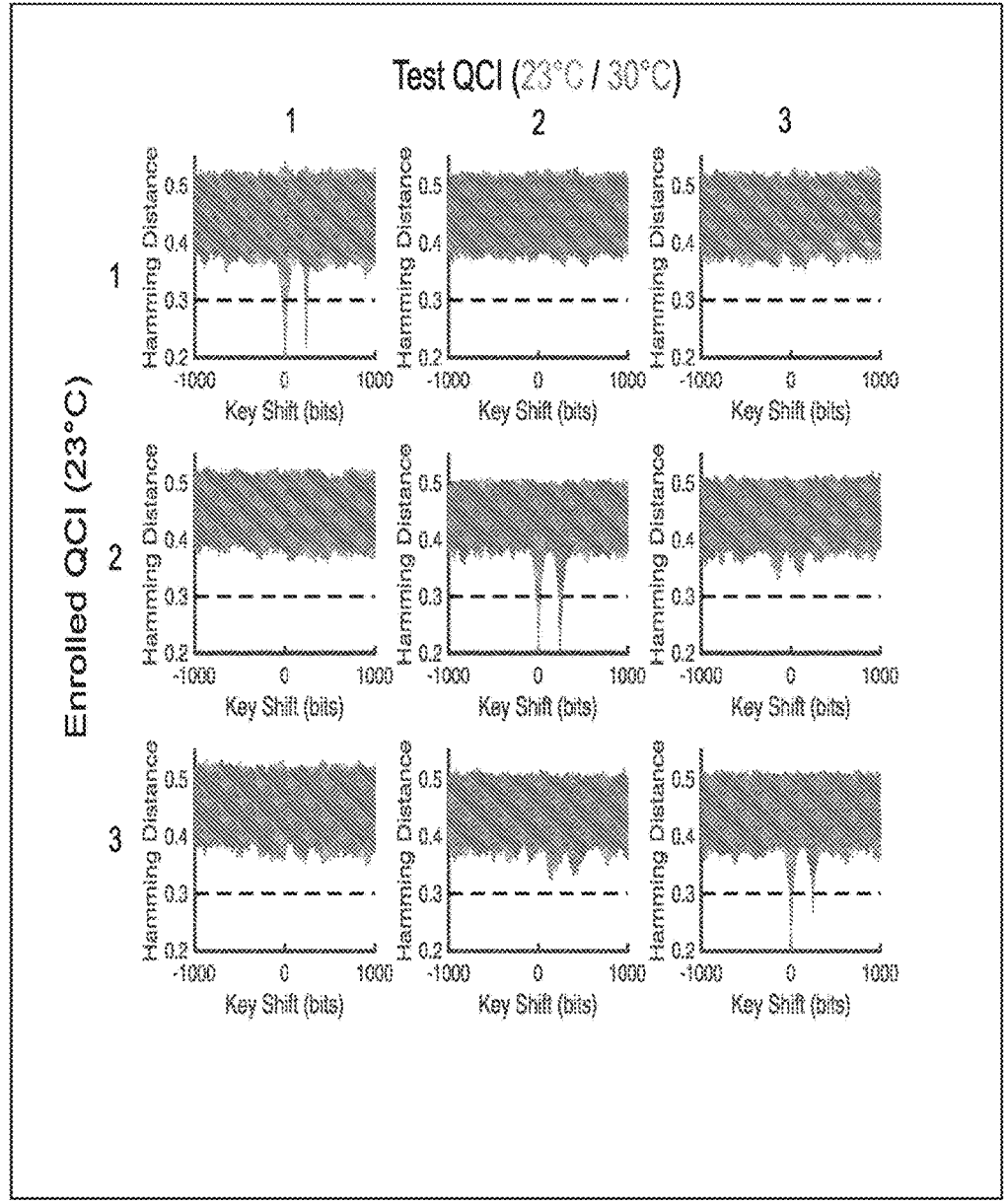
FIG. 4A illustrates graphs of performed Hamming distance (HD) authentication analysis on the three QCI PUFs (that is, for each silicon photonic QSI PUF at two temperature settings), regarding presently disclosed subject matter.

As shown in FIG. 4A, we first performed HD authentication analysis on the three QCI PUFs (that is, for each silicon photonic QSI PUF at two temperature settings). In this computation, each raw spectrum is normalized to the directional coupler reference spectra and then converted to a binary sequence with >10,000 bits. A central subset of 8,000 bits is then enrolled and computationally shifted relative to various test keys, at both temperature settings, to search for a match (i.e., HD<0.3), which is a strong indication of the authenticity. The results confirm the uniqueness of each PUF and validate authentication of each device at both temperature settings. In other words, per Hamming authentication, uniqueness and authentication were confirmed over temperature variations. However, while Hamming analysis apparently works well for authentication, it is not computationally efficient for identification within large device libraries.

Figure 4B:
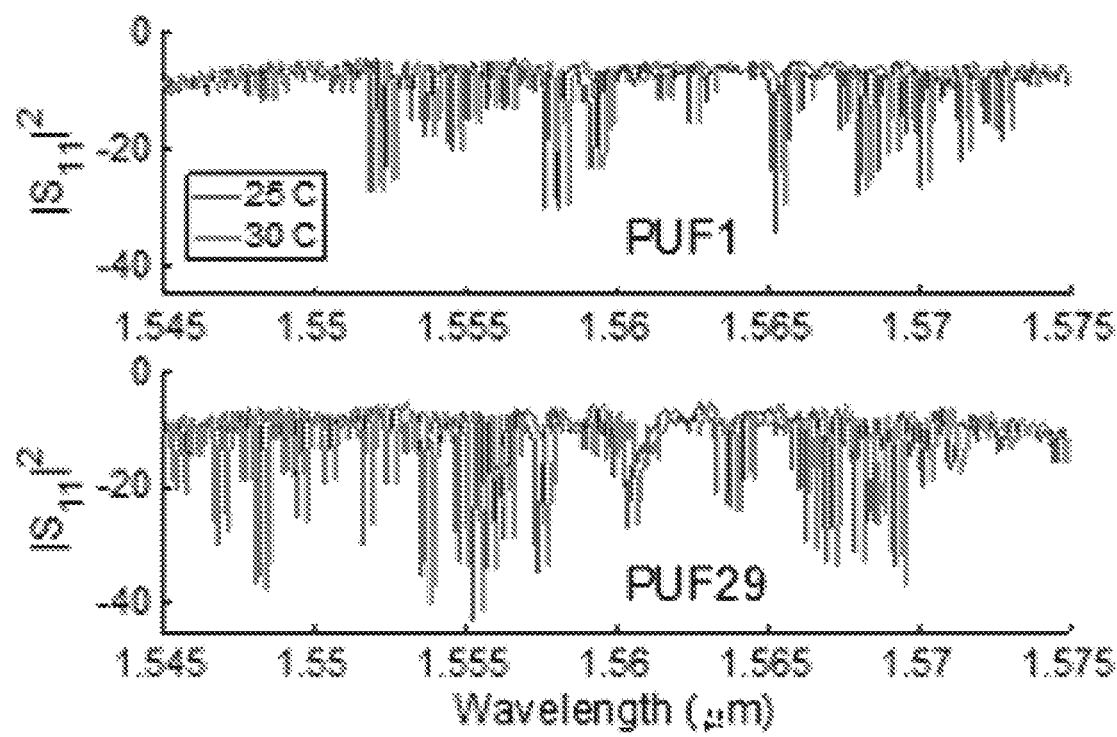
FIG. 4B illustrates graphs of measured spectra of two different examples of presently disclosed devices (PUF 1 and PUF 29), for respective temperatures 25° C. and 30° C.
Figure 4C:
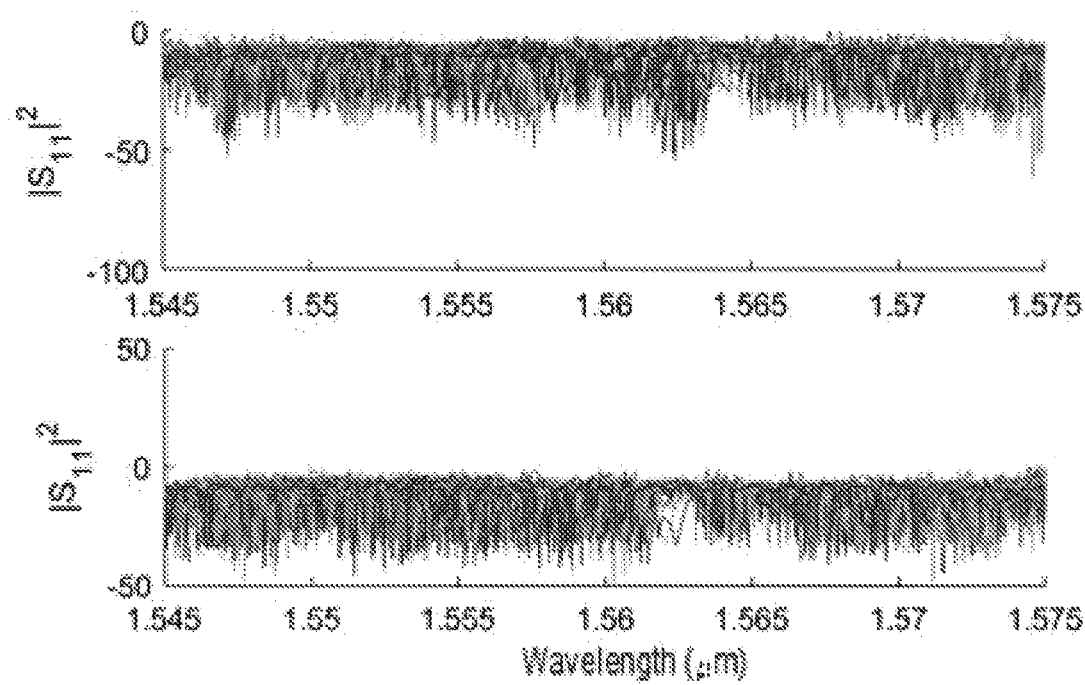
FIG. 4C illustrates graphs of spectra images for all of presently disclosed PUF data (56 authentications), with the top of FIG. 4C showing devices 1-28 and bottom of FIG. 4C showing 29-56.

Initially, the presently disclosed QCI PUF device was replicated N=3 times, which allowed for 3 authentications and only 6 inter-device comparisons. That demonstration effort was expanded to 56 authentications and 3,080 inter-device comparisons in order to strongly justify our PUF concept. In other words, we demonstrate N=56 authentications and N(N-1)=3,080 inter-device comparisons. All 56 devices feature the exact same design and fabrication process, yet their optical performances are ultimately entirely unique. This is exemplified in the difference between PUF 1 and PUF 29 spectra shown in FIG. 4B. More specifically, FIG. 4B illustrates graphs of measured spectra of two different devices (e.g., #1& #29) for 25° C. and 30° C. Graphs of the spectra look like the FIG. 4C image if we take all the PUF data (56 authentications) into consideration (top of FIG. 4C showing devices 1-28 and bottom of FIG. 4C showing 29-56).

Figure 4D:
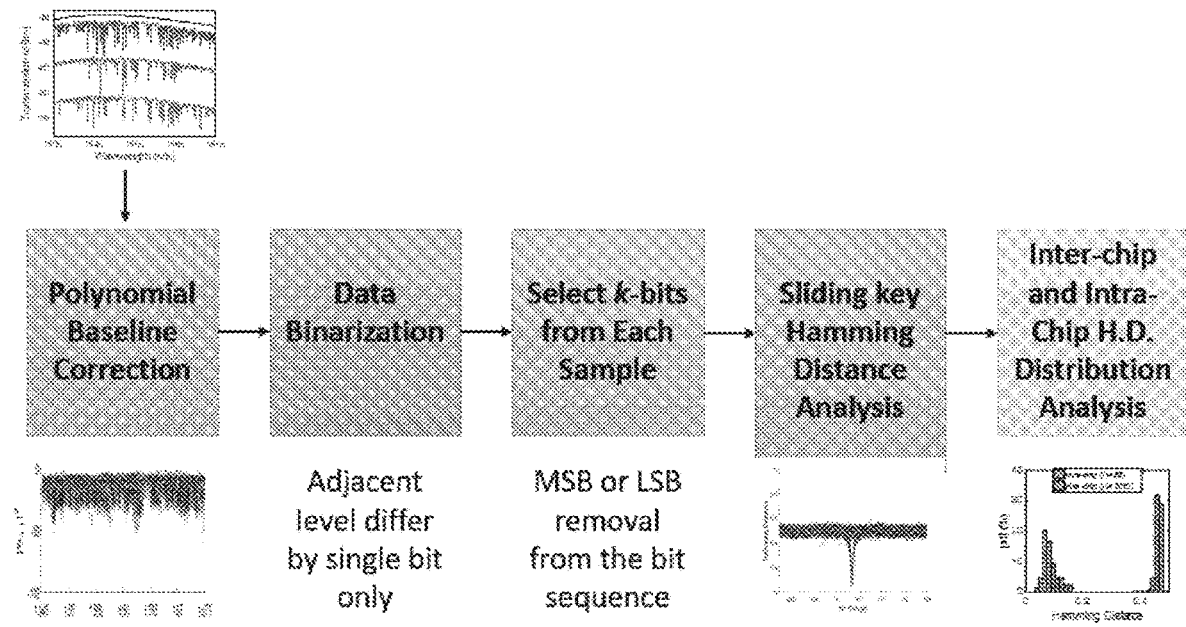
FIG. 4D illustrates a flowchart of steps going from obtained spectra data to analysis, per presently disclosed subject matter regarding authentication technique.

FIG. 4D illustrates a flowchart of steps going from obtained spectra data to analysis, per presently disclosed subject matter. In particular, the flowchart represents presently disclosed complete authentication technique where post-processing spectrum following a baseline correction removes the envelope created by the grating and directional couplers. The data from all 56 devices under both temperatures is then binarized to enable a sliding key HD analysis to establish the proper authentication among these devices. We then analyze the intra-chip and inter-chip HD distributions to verify the absence of data overlapping, as further explained herein.

Figure 4E:
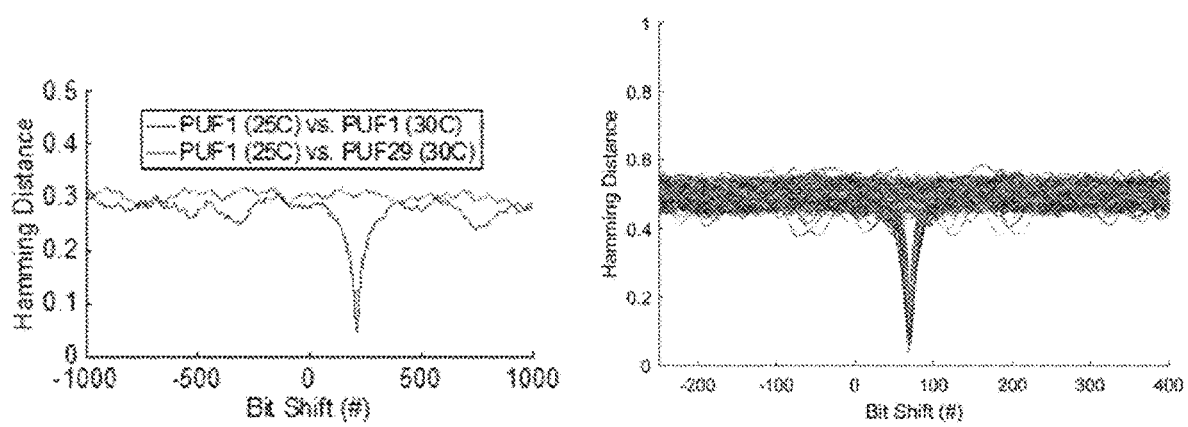
FIG. 4E illustrates graphs of sliding key comparisons of exemplary presently disclosed devices' digital fingerprints.

FIG. 4E illustrates graphs of sliding key comparisons of two exemplary presently disclosed devices' digital fingerprints. In particular, the left side illustrates relative to exemplary devices PUF 1 and PUF 29, while the right-side illustrates data from plural PUF devices. Each of the devices will match only with itself and not any other device. The matched device's HD goes less than 0.1, which is a strong indication of the authenticity.

HD analysis is a known technique to analyze the authentication of a device. In this instance, we executed Hamming analysis on our chips in two temperature settings: 25° C. and 30° C. Each raw spectrum is normalized to the directional coupler reference spectra and then converted to a binary sequence with >10,000 bits. A central subset of 8,000 bits is then enrolled and computationally shifted relative to various test keys, at both temperature settings, to search for a match.

While running the computation within an array of 56×56 devices, each of the devices will match only with itself and not any other device. Our matched device's HD goes less than 0.1, which is a strong indication of the authenticity. We can also improve the signal to noise ratio in the process by playing the MSB and LSBs. The results confirm the uniqueness of each PUF and validate authentication of each device at both temperature settings.

Figure 4F:
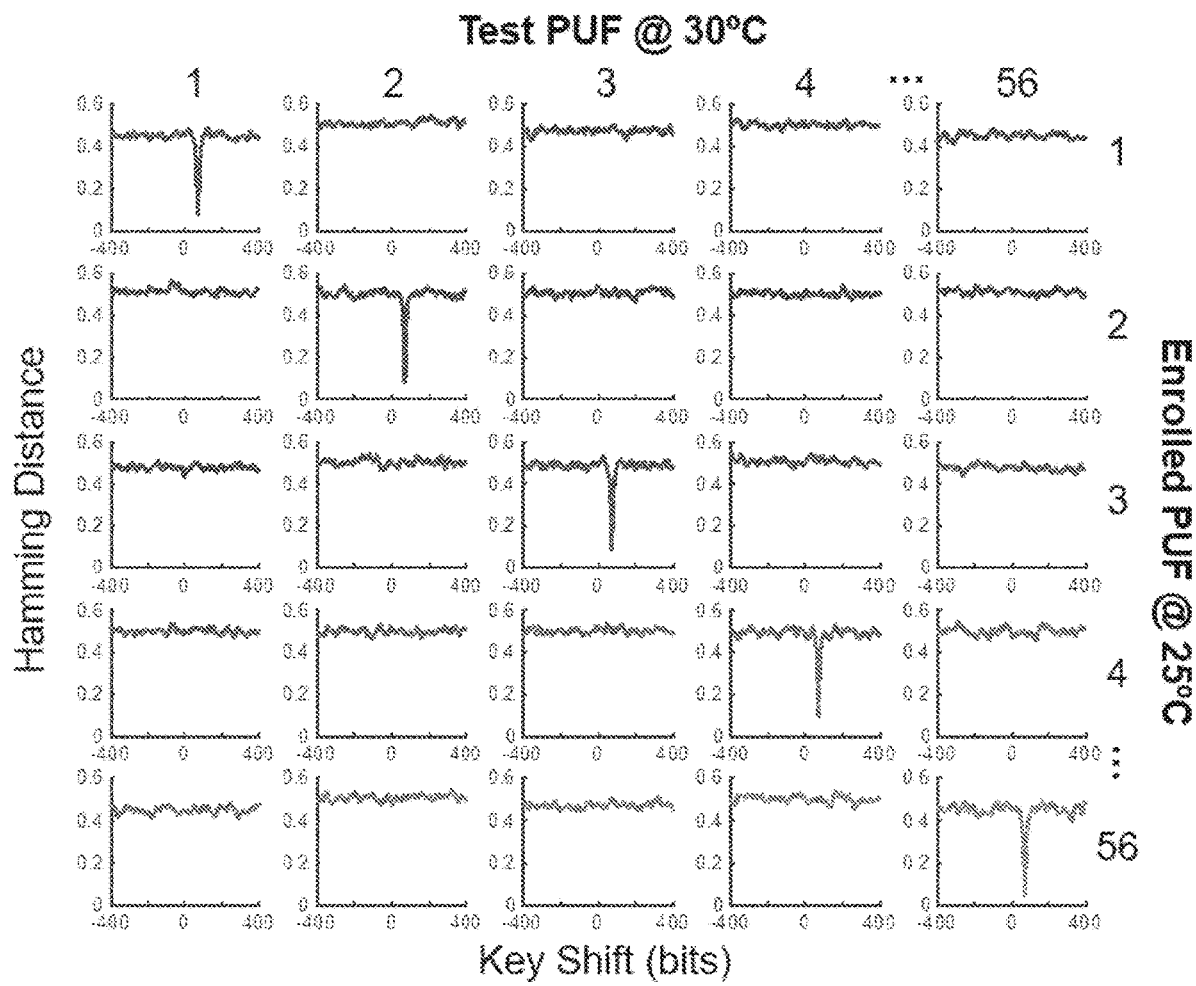
FIG. 4F illustrates a plurality of representative graphs involved with HD evaluation for all 56 intra-chip and 3,080 inter-chip comparisons, including base key shift data for two respective test temperatures.
Figure 4G:
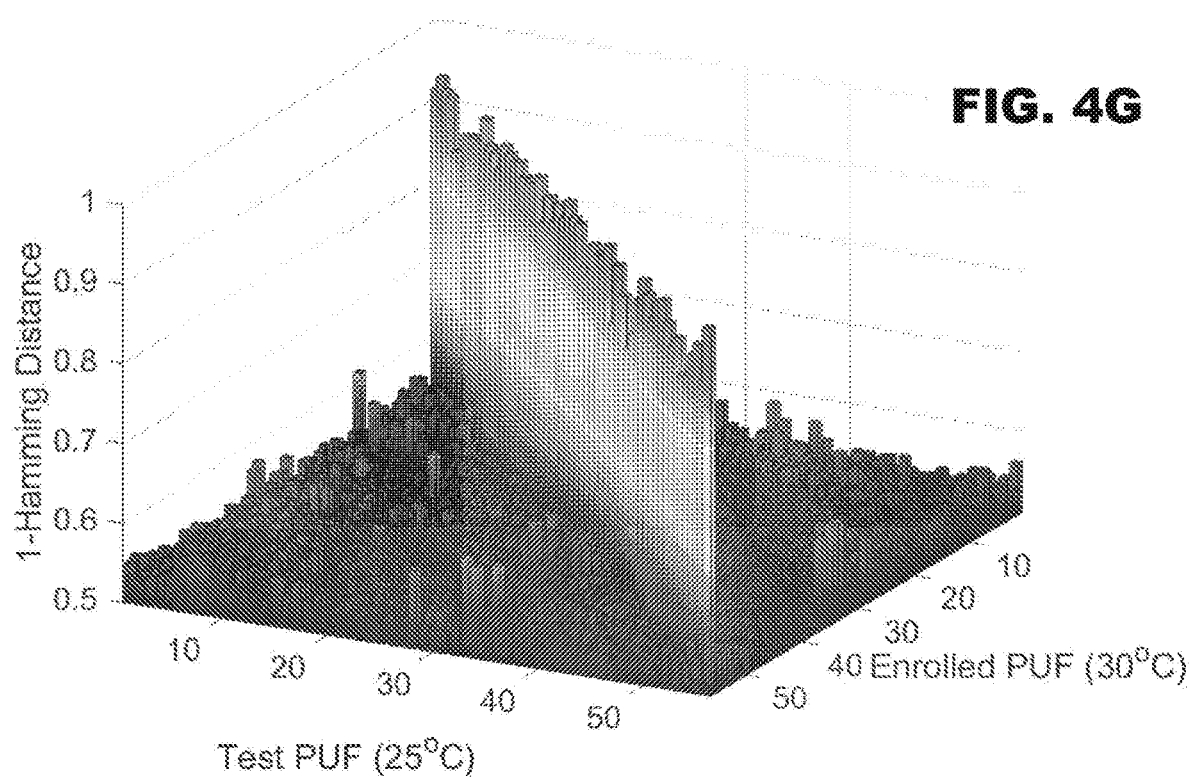
FIG. 4G comprises a 3D plot of data such as per application FIG. 4F where the authentication is decided with respect to the yellow threshold value.
Figure 4H:
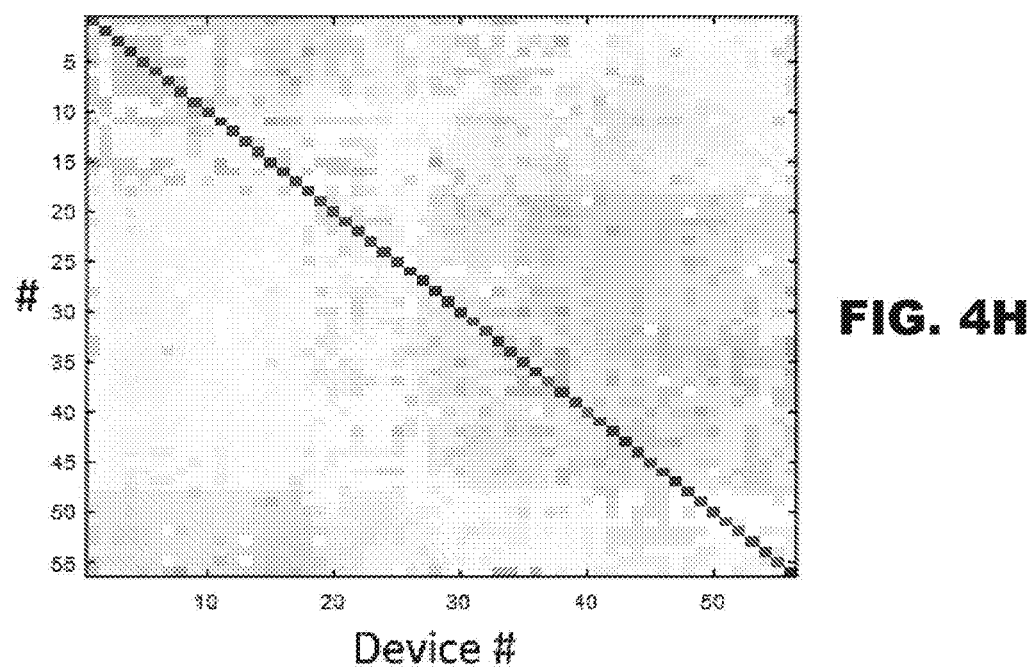
FIG. 4H is an image plot of data for 56 presently disclosed devices, representing the success of Hamming authentication.

FIG. 4F illustrates a plurality of representative graphs involved with HD evaluation for all 56 intra-chip and 3,080 inter-chip comparisons, including base key shift data for two respective test temperatures. FIG. 4G comprises a 3D plot of such data (FIG. 4F) where the authentication is decided with respect to the yellow threshold value. FIG. 4H is an image plot of data for 56 presently disclosed devices, representing the success of Hamming authentication.

Figure 4I:
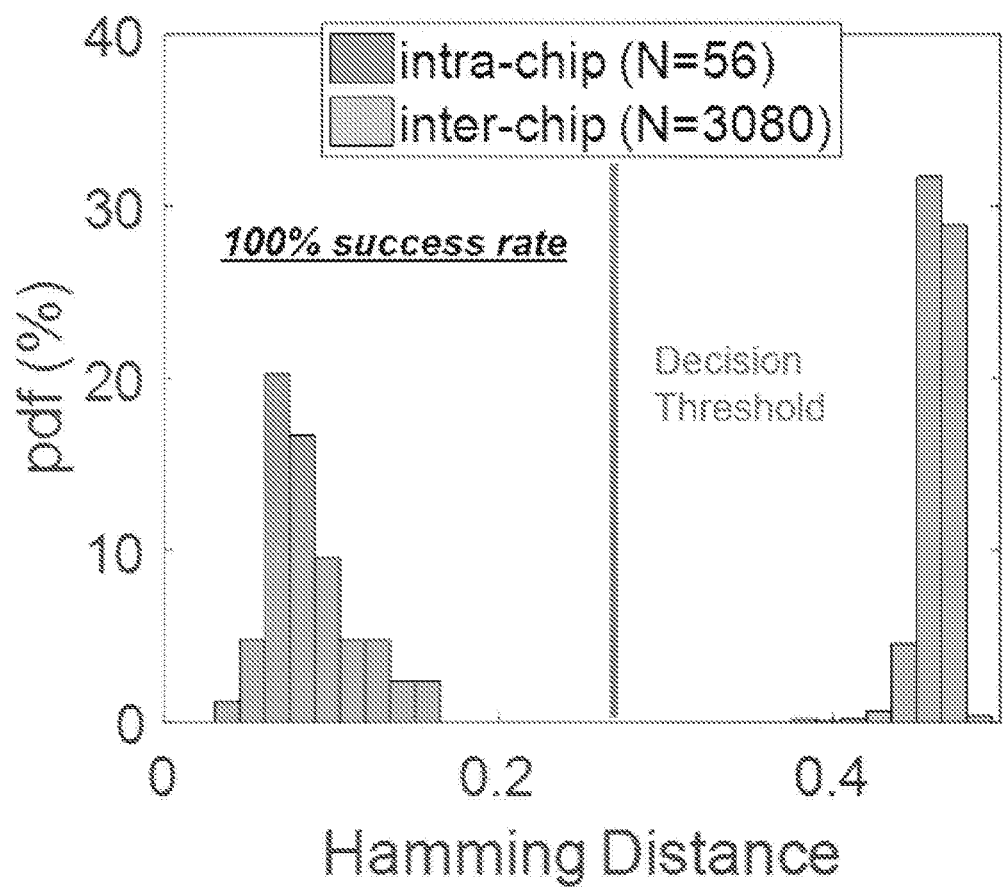
FIG. 4I illustrates probability density function summarizing intra-chip vs. inter-chip HD distributions, showing the distributions do not overlap.

FIG. 4I illustrates probability density function summarizing intra-chip vs. inter-chip HD distributions, showing the distributions do not overlap. We analyzed the intra-chip and inter-chip HD distributions as shown in FIG. 4I and verified that there is no overlap between the intra-chip and inter-chip distributions. This validates the uniqueness and unclonability of the presently disclosed fabricated devices and allows a clear authentication decision threshold to be drawn.

In general, directly using the raw output signals of the PUFs for authentication or identification is neither efficient nor robust. To this end, an entropy-harvesting method that can extract chip-unique features will significantly improve the overall performance and functionality of the proposed PUFs and enable scalable identification with large device libraries. The entropy of the spectra of the PUFs generally comes from two sources: inter-chip and intra-chip variations. Inter-chip variations are the intrinsic variations introduced during the fabrication, while intra-chip variations are caused by environmental changes or device aging[8,55,56]. Thus, in order to enhance both the uniqueness and reliability of the PUF signature, an ideal entropy-harvesting method should be able to leverage manufacturing process variations, while mitigating intra-chip variations[8,55-58]. This includes mitigating any residual probing and/or environmental variations in the grating coupler's low frequency spectral envelope (FIG. 3A) or the PUF's spectral fingerprint. In our experiments, we applied two types of techniques, i.e., feature extraction and correlation analysis, to illustrate the effectiveness of our integrated photonic PUFs.

Figure 5A:
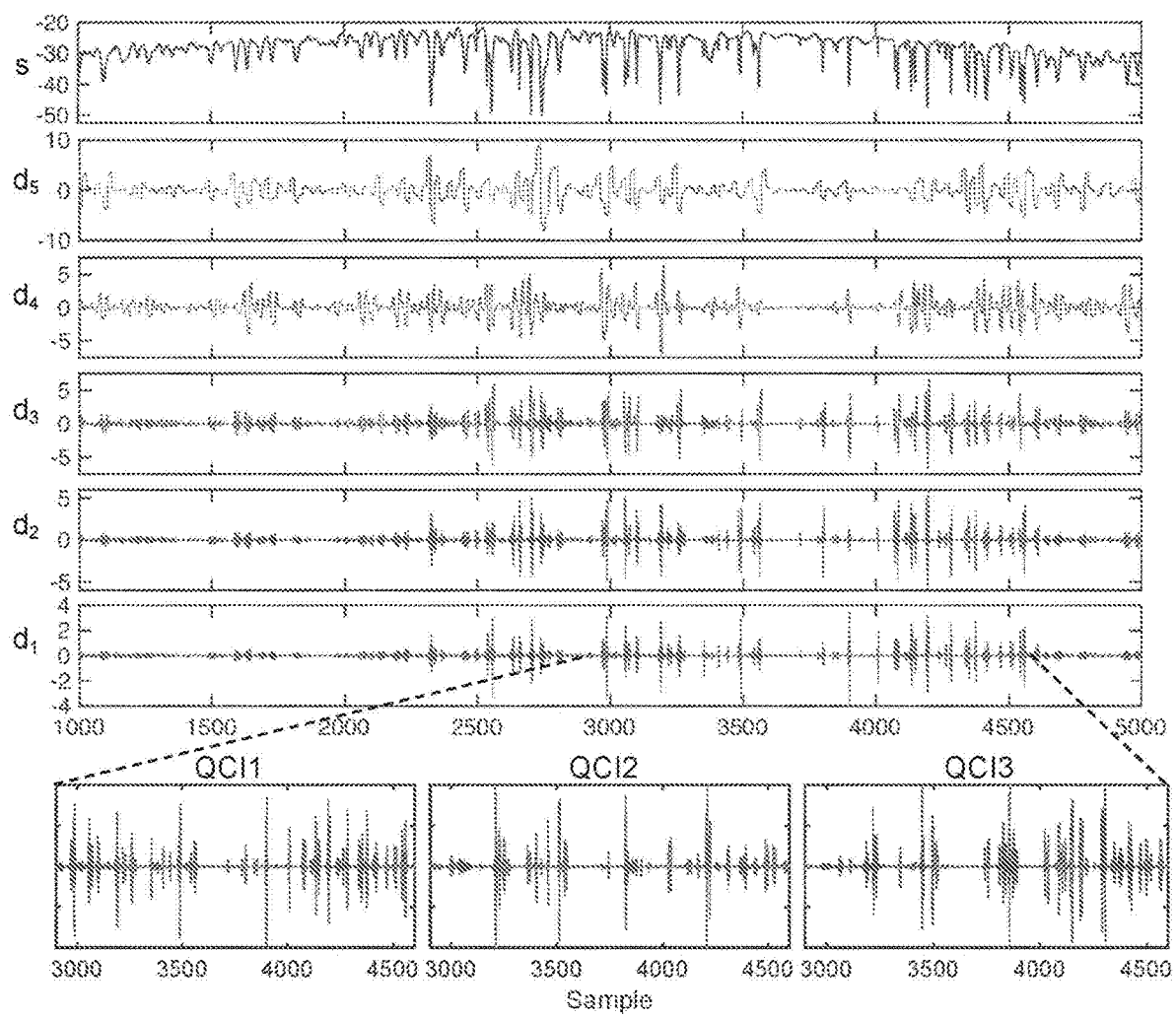
FIG. 5A illustrate graphs of Fejer-Korovkin derived features, for subject QCI PUFs per presently disclosed subject matter.

For the feature extraction method, we use wavelets to decompose the signal. FIG. 5A shows an example of the wavelet decomposition of the raw output signal, s, for QCI1 along with part of the first level of decomposition for all three devices. The best results are observed when we use five-level decompositions (e.g., $d_5$, $d_4$, $d_3$, $d_2$, $d_1$) with Fejer-Korovkin, Symlet, Reverse Biorthogonal wavelets[59]. The standard deviation and variance of corresponding sub-bands are then chosen as features.

It can be clearly seen from both FIGS. 5A and 5B, which illustrate the Fejer-Korovkin-derived features, that different devices yield distinct features. As indicated in FIG. 5B, it is observed that the features of the QCI PUFs are stable, since the intra-chip variation is significantly less than the inter-chip variation. FIG. 5B illustrates exemplary PUF features extracted from a five-level Fejer-Korovkin wavelet decomposition. As shown by FIG. 5A, after decomposition, the devices can be effectively distinguished. Correlation analysis of the signals derived from power spectral density strengthens the identification process.

Thus, for feature extraction, standard deviation and variance of selected sub-bands may be used to generate the intended features of large inter-chip variation and low intra-chip variation.

Device identification can be performed by enrolling the device under test's features and carrying out an error analysis to identify the device features which yield the lowest mean squared error. Identification can be further strengthened by verifying agreement across different decompositions or complementary techniques such as a power spectral density-derived signal correlation. Results for device identification are displayed in FIG. 5C. Correct identification of our QCI PUFs is achieved in all cases, regardless of temperature setting, allowing us to conclude that each PUF will be distinguishable across temperature. For the clonable MGTI devices however, the features are not sufficiently unique, and hence, different wavelet decompositions misidentify the enrolled device. Stated another way, the results of feature extraction and correlation analysis depicted in FIG. 5C are applicable to device identification. The "unclonable" QCI PUFs achieve substantial inter-chip variations and are stable across different environmental conditions, while the inter-chip variations of the "clonable" design are not sufficient to identify the enrolled device.

In this work, we introduced and demonstrated photonic circuitry employing single-mode TE polarization mode filtering alongside a weakly modulated QCI as a means for realizing a robust PUF. Similar to the original vision of the first optical scattering PUFs, our device probes not only investigate spatially distributed randomness but also realizes it in a highly integrated fashion because it is designed to be inherently stable against probing and environmental variations. By comparing our QCI to less complex interferometers, we also experimentally highlighted how randomness is a necessary, but not sufficient, criteria to achieve unclonable device signatures. We further demonstrated feature extraction as a viable means for optical PUF identification. Since the main source of inter-chip variations are in waveguide width and surface roughness, by precisely analyzing each signal segment within a specific 'frequency' domain, and confined 'time' domain, it is ensured that these variations are captured during feature extraction and that the most unique features are chosen for the proposed PUFs.

Unlike highly multi-mode devices based on chaos, which are extremely sensitive to all conditions, or single-mode optical backscatter which is environmentally stable but extremely weak, the signatures of our device are highly visible, random, and environmentally stable. We presented a robust PUF with a weakly modulated QCI alongside single-mode TE polarization mode filtering. As a result, our PUF architecture is fully compatible with automated wafer-scale measurement techniques and fosters scalable implementation within silicon photonic transceivers or photonic systems on a chip as an optical hardware security layer. This work also unveils a new means for amplifying and harnessing the effects of 'weak' disorder in photonics—while simultaneously harnessing or constraining specific degrees of freedom—and highlights a viable technological application of quasicrystals and Anderson-localized and -extended states. Applying the principles of degree-of-freedom constraints, modal selectivity, and confinement factor control principles could support the realization of a new generation of disordered photonic systems. In the future, we envision opportunities to further enhance and utilize the functionality of integrated photonic PUFs by leveraging active devices, reconfigurability, multiplexing, far-field signaling, or quantum optics to realize entirely new levels of hardware and information security.

Modelling methods may be described in part as follows. To model the potential characteristics of random silicon photonic PUFs, we developed a transfer matrix model incorporating random parameter variations to derive the complex s-parameters of randomized SBRs with varying degrees of disorder. These s-parameters (i.e., amplitude and phase spectra for forward and reverse excitation) are then embedded into a scattering matrix simulator (Lumerical INTERCONNECT) which also accounts for the YBs, routing waveguides, and loop mirrors.

Device fabrication and testing was carried out through the SiEPIC program[60]. Structures were fabricated using standard 220 nm SOI via 100 keV electron beam lithography and reactive ion etching at the University of Washington, while automated grating coupled device measurements were performed at The University of British Columbia. A tunable laser (Agilent 81600B) and optical power meter (Agilent 81635A) were used to capture device spectra over the range 1500-1600 nm in 10 pm steps.

Figure 6A:
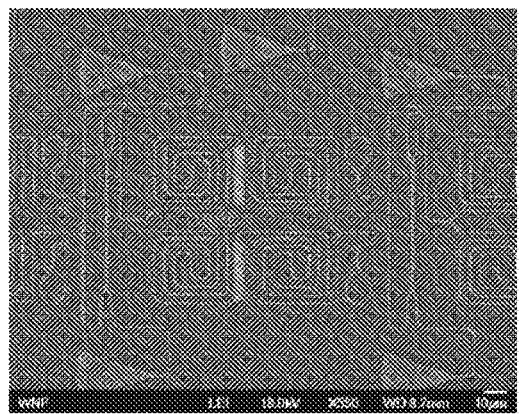
FIG. 6A illustrates a scanning electron microscope image of a MGTI.
Figure 6B:
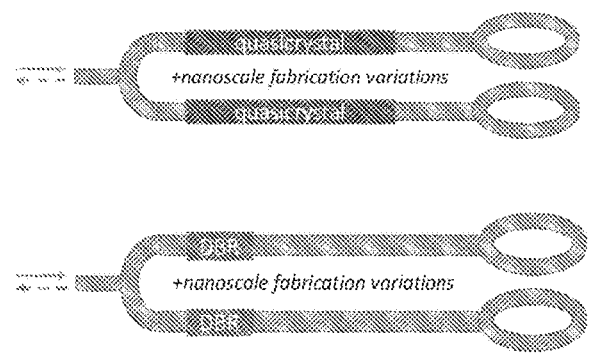
FIG. 6B illustrates schematic type representations of presently disclosed QCI PUFs regarding presently disclosed unclonable subject matter (top image) versus existing clonable subject matter regarding MGTIs (lower image)

FIG. 6A illustrates a scanning electron microscope image of a MGTI. FIG. 6B illustrates schematic type representations of presently disclosed QCI PUFs regarding presently disclosed unclonable subject matter (top image) versus existing clonable subject matter regarding MGTIs (lower image).

Figure 7A:
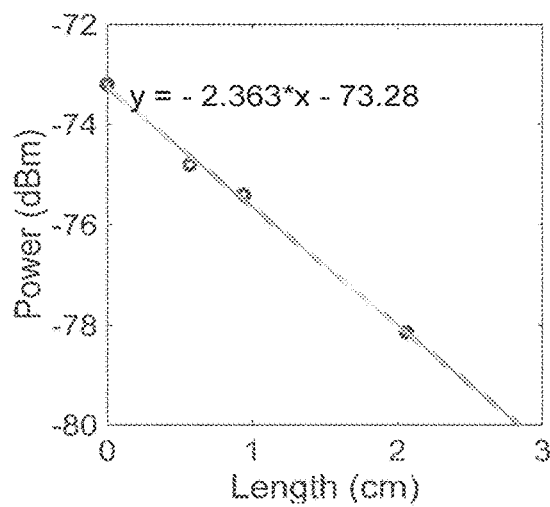
FIG. 7A illustrates spiral waveguide loss determination via the cutback method.
Figure 7B:
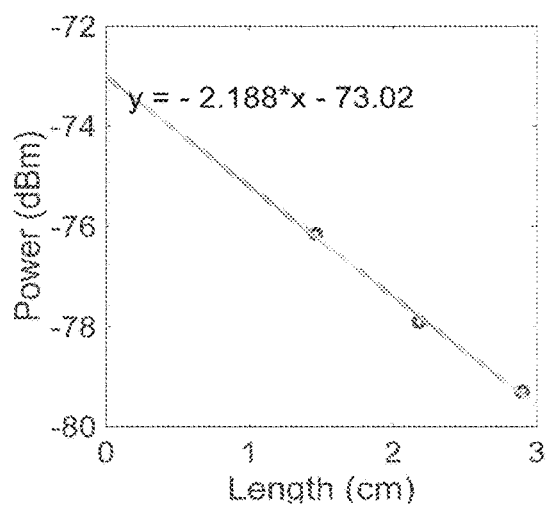
FIG. 7B illustrates straight waveguide loss determination via the cutback method.

The following relates to waveguide loss data. An important parameter to consider in any silicon photonic structure is the waveguide loss. The loss can be classified as scattering loss (due to sidewall roughness), absorption loss (not present here), and radiative loss (in a bent waveguide). Both spiral and straight waveguide loss has been measured in our study. FIGS. 7A and 7B show schematic representations of waveguide loss. FIG. 7A illustrates spiral waveguide loss determination via the cutback method, while FIG. 7B illustrates straight waveguide loss determination via the cutback method. As expected, the slope of power loss for spiral waveguide is steeper than that of straight waveguide owing to a combination of radiative and scattering loss. The spiral waveguide loss is therefore approximately ~2.4 dB/cm. After extracting the s-parameters from random simulated devices, the entire QCI was simulated in an s-parameter modelling tool (Lumerical INTERCONNECT). This model accounts for waveguide loss, and hence many features are visible even when $\Delta\_n=0$.

The simulated spectra show that unique spectral fingerprints are achievable and come with very high visibility (easy to measure) with large extinction ratios.

The following relates to the transfer matrix approach to disorder in a 1D multiple scattering system. To describe 1D multiple scattering in a method which can include simulated randomness, we developed a modified form of the transfer matrix method[61]. The forward and backward propagating electric fields at the start ($|\overline{s=0}|$) and end ($|\overline{s=0}|$) of a given waveguide segment, $\overset{m,}{\sqcup}$ of length $|\overline{l_m}|$ (See FIGS. 2A through 2H) are related to each other by the expression:

$$\left| \begin{bmatrix} E_{m,0}^+ \\ E_{m,0}^- \end{bmatrix} = P_m \begin{bmatrix} E_{m,l_m}^+ \\ E_{m,l_m}^- \end{bmatrix} \right|, \tag{S2.1}$$

where $|P_m|$ denotes the propagation matrix accounting for the accumulation of phase in the forward and backward directions:

$$\left| P_m = \begin{bmatrix} e^{-i\psi_m(\lambda)} & 0 \\ 0 & e^{i\psi_m(\lambda)} \end{bmatrix} \right|. \tag{S2.2}$$

The phasor argument, $|\overline{\psi_m(\lambda)}|$, which describes propagation in the layer is importantly: (1) a complex quantity, (2)

wavelength dependent, and (3) calculable from an integration of the local complex wave vector along the segment path as:

$$\left|\psi_m(\lambda)\right| = \frac{2\pi}{\lambda}\int n_{\text{eff},m}(\lambda, s)ds + \frac{i}{2}\int \alpha_m(\lambda, s)ds. \tag{S2.3}$$

Here $|\overline{n_{\text{eff},m}(\lambda,s)}|$ is the waveguide's local effective index along the segment path and $|\overline{\alpha_m(\lambda,s)}|$ is the local attenuation coefficient (i.e., arising from sidewall roughness and Rayleigh scattering). The effective index is a function of waveguide width and is sensitive to fabrication variations on the nanometer scale, $$\left|\frac{dn_{\text{eff}}}{dw}\right| \sim 1.5\times 10^{-3}[RIU/\text{nm}] @ 1550 \text{ nm}$$

(note: in the slow light regime, this sensitivity is further enhanced). Fabrication variations, distributed along the waveguide path, distort the local effective index away from the expected value for the segment (note: the expected value is assumed to account for the global, or average, critical dimension bias of a given process). The real part of $|\psi_m$, which describes the local phase, can be re-expressed in terms of the expected value and the random deviation of effective index as:

$$|\text{Re}[\psi_m(\lambda)]| = l_m \frac{2\pi}{\lambda}(\langle n_{\text{eff},m}(\lambda)\rangle + \delta n_m \cdot Rand_{1,m}) \tag{S2.4}$$

where $|\delta n_m$ is the maximum possible effective index deviation for the segment and $|\overline{Rand_{1,m}}|$ is a random number over the interval $[-1, 1]$ with probability distribution which is assumed to be uniform. This approach allows waveguide and material dispersion to be embedded within the model, rather than ignored as in alternative methods[61]. Similarly, the imaginary part of $|\overline{\psi_m}$, which describes the local attenuation coefficient, can be re-expressed as:

$$|Im[\psi_m(\lambda)]| = l_m i/2(\langle\alpha_m(\lambda)\rangle + \delta\alpha_m \cdot Rand_{2,m}) \tag{S2.5}$$

where $|\delta\alpha m$ is the maximum possible change in attenuation coefficient for the segment and $|\overline{Rand_2}$ is a randomly generated number over the interval $\overline{[0, 1]}$, independent from $|Rand1\_$. Since the waveguide is theoretically losses and losses are introduced by random backscatter, we choose to set $|\langle \alpha m\ (\lambda)\rangle = 0$ and then define $|\delta\alpha m$ such that an average attenuation coefficient $|\delta\alpha m/2$ corresponds to the experimentally measured average propagation loss.

In addition to affecting the characteristics of wave propagation, local fabrication variations also distort the Fresnel reflection and transmission coefficients at the interface between waveguide segments. The transmission and reflection of forward and backward propagating waves can be described by the expression:

$$\left|\begin{bmatrix}E_{m-1}^-\\E_{m-1}^+\end{bmatrix}\right| = I_{m-1,m}\begin{bmatrix}E_m^+\\E_m^-\end{bmatrix}, \tag{S2.6}$$

where $|\overline{I_{m-1,m}}$ is the interface matrix defined as $$I_{m-1,m} = \frac{1}{t_{m-1,m}}\begin{bmatrix}1 & r_{m-1,m}\\r_{m-1,m} & 1\end{bmatrix}. \tag{S2.7}$$

Here we define the Fresnel coefficients using the same random effective index variation embedded into Eq. (S2.4):

$$\left|r_{m-1,m}(\lambda) = \frac{\langle n_{\text{eff},m-1}(\lambda)\rangle + \delta n_{m-1}\cdot Rand_{1,m-1} - \langle n_{\text{eff},m}(\lambda)\rangle - \delta n_m\cdot Rand_{1,m}}{\langle n_{\text{eff},m-1}(\lambda)\rangle + \delta n_{m-1}\cdot Rand_{1,m-1} + \langle n_{\text{eff},m}(\lambda)\rangle - \delta n_m\cdot Rand_{1,m}}\right., \tag{S2.8}$$

$$\left|t_{m-1,m}(\lambda) = \frac{2\langle n_{\text{eff},m-1}(\lambda)\rangle + 2\delta n_{m-1}\cdot Rand_{1,m-1}}{\langle n_{\text{eff},m-1}(\lambda)\rangle + \delta n_{m-1}\cdot Rand_{1,m-1} + \langle n_{\text{eff},m}(\lambda)\rangle + \delta n_m\cdot Rand_{1,m}}\right.. \tag{S2.9}$$

With these propagation and interface matrices so defined, a standard transfer-matrix method[61] can be used to model transmission and reflection for a multiple scattering device of any nominal design. The complex s-parameters describing the reflection/transmission amplitude and phase are then extracted for both forward and reverse excitation of randomized spiral quasicrystals and fed into a scattering matrix simulator (Lumerical INTERCONNECT) to simulate the entire QCI.

The following considers the role of confinement factor in spectral signature stability over temperature. The frequency shift of the $n^{th}$ optical mode in a given system, can be expressed using variational methods[62].

$$\frac{\Delta\omega_n}{\omega_n} = -\frac{\int \langle\Delta u_n\rangle dV}{\int \langle u_n\rangle dV} \tag{S3.1}$$

where $\langle\underline{n}\rangle$ is the time averaged electromagnetic energy density, $|\underline{un}$, and $|\langle\underline{\Delta un}\rangle$ is the time averaged perturbation in electromagnetic energy density. The electromagnetic energy density can be written as:

$$|u_n = u_{E,n} + u_{H,n} = \frac{1}{2}[D\cdot E + H\cdot B]| \tag{S3.2}$$

For non-magnetic devices, environmental variations (matter-light interactions) perturb only the electric field energy density $|u_{E,n}$, owing to the perturbations being isolated to the permittivity. When integrated over all space and averaged in time, we can replace the denominator of S3.1 with $\int \langle u_n\rangle dV = 2\int\langle u_{E,n}\rangle dV$. The numerator meanwhile may be re-expressed as:

$$\int\langle\Delta u_n\rangle dV = \int\langle\Delta u_{E,n}\rangle dV \tag{S3.3}$$

For a uniform refractive index perturbation applied only to some 'active' volume (e.g., a thermo-optic index change applied to the high index material) we may write:

$$\int \langle \Delta u_{E,n} \rangle dV = \frac{2\Delta n_{active}}{n_{g,active}} \int_{active} \langle u_{E,n} \rangle dV \quad (S3.4)$$

Eq. S3.1 can thus be rewritten as:

$$\frac{\Delta \omega_n}{\omega_n} = -\frac{\Delta n_{active}}{n_{g,active}} \frac{\int \langle u_{E,n} \rangle dV}{\int \langle u_{E,n} \rangle dV} = -\frac{\Delta n_{active}}{n_{g,active}} \gamma_{active,n} \quad (S3.5)$$

The fractional frequency shift of the $n^{th}$ mode is therefore proportional to the change in refractive index and a "confinement factor" $\gamma_{active,n}$, which may be expressed as:

$$\gamma_{active,n} = \frac{\int_{active} \in (\vec{r}) |E_n(\vec{r})|^2 dV}{\int \in (\vec{r}) |E_n(\vec{r})|^2 dV} \quad (S3.6)$$

It should be emphasized that thermo-optic stimuli can easily perturb a resonant frequency by a magnitude much larger than its full-width half maximum and much larger than the nearest mode to mode frequency spacing, i.e., in general, it is likely that in practice $|\Delta \omega_n| \gg \omega_{fwhm,n}$ and $|\Delta \omega_n| \gg |\omega_{n\pm1} - \omega_n|$. If an optical device has many resonant modes contributing features to its spectrum, then the optical spectrum will 'evolve' or be reconfigured (i.e., to generate a new signature) if $\gamma_{active,n}$ is not a stable or very slowly varying function of the mode frequency. To ensure a stable spectrum pattern (which is allowed only to shift or stretch, but not to evolve) and therefore a stable PUF signature, it is necessary to ensure $\gamma_{active,n}$ is approximately constant or slowly and weakly varying across all modes. Follow-up simulation which emphasizes and demonstrates this effect is shown below herewith.

For a 3D waveguide-based device, the confinement factor could further be separated into longitudinal and transverse confinement factors. Therefore, both the longitudinal and transverse confinement factors must be approximately constant or slowly and weakly varying to obtain a PUF signature which is stable over temperature. To ensure these requirements are met, we select a single transverse mode waveguide which is then very weakly modulated in its width along the longitudinal coordinate. A multimode waveguide would naturally have highly variable transverse confinement factors and could not satisfy the above requirement. Similarly, a strongly modulated index profile along the longitudinal coordinate (as in high-index contrast photonic crystals) would result in large variations in the longitudinal confinement factor from mode to mode. Similarly, highly multimode microdisks and other types of on-chip resonators often naturally support many modes with a wide variation in their confinement factors. Such platforms are inherently unable to guarantee stable optical signatures in response to thermo-optic stimuli.

The following relates to wavelet decomposition. Wavelets are special functions that have localized properties with respect to both frequency and space variables. Wavelet transform basically decomposes the input signal in time and frequency plane. The Equations below are the discrete wavelet transform (DWT) of input $|\overline{x(n)}|^{63,61}$:

$$\gamma_i(n) = \sum_{k=-\infty}^{\infty} x(k) \times h_i(2^{i+1}n - k), \text{ for } 0 \le i \le m - 2, \quad (S4.1)$$

$$\gamma_{m-1}(n) = \sum_{k=-\infty}^{\infty} x(k) \times h_{m-i}(2^{m-1}n - k), \text{ for } i = m - 1, \quad (S4.2)$$

The shifted and scaled version of "mother wavelet": $|h(n), \{h_i(2^{i+1}-k) \text{ for } 0 \le i \le m-1, -\infty < k < \infty\}$ are the basis functions, and $|\overline{y_i(n)}$ are the wavelet coefficients[63,64].

DWT periodically processes M input samples and generates M output samples at various frequency bands where $|\overline{M=2^m}$ and M is the number of wavelet levels. DWT is normally implemented in a tree structure. Each step contains two digital filters $|\overline{g(n)}$ and $|\overline{h(n)}$, and two down-samplers with a factor of 2 The input sequence of $|s_{j-1}(n)$ is fed to both the high pass filter $|\overline{g(n)}$ and the low pass filter $|\overline{h(n)}$. Let n and j be the sample index and the level index, the output signals can be computed as follows[63,64]:

$$\left| s_j(n) = \sum_k s_{j-1}(k)g(2n-k) = \sum_k g(k)s_{j-1}(2n-k), \right. \quad (S4.3)$$

$$\left| w_j(n) = \sum_k s_{j-1}(k)h(2n-k) = \sum_k h(k)s_{j-1}(2n-k). \right. \quad (S4.4)$$

The following relates to simulation/analysis of a QCI PUF over temperature. As otherwise noted and detailed herein, to realize optical PUF authentication over temperature, it is imperative for a particular optical PUF to retain its inter-chip variation dominated signature over temperature. This requires achieving uniformity in the confinement factor of all modes. Here, we present numerical simulation of a random QCI PUF, herein called "sim1", which is designed to achieve uniformity in both the longitudinal and transverse confinement factors, similar to the nominal experimental design discussed in the main text. In this simulation, we assume that the disordered waveguide effective index is thermo-optically perturbed according to the expression:

$$\left| \Delta n_{eff} = \Delta n_{Si,TO} \frac{n_g}{n_{Si}} \gamma_{Si} \right. \quad (S5.1)$$

where $$\left| \Delta n_{Si,TO} = \Delta T \frac{\partial n_{Si}}{\partial T} \right.$$

is the thermo-optic index change of silicon, occurring with a thermo-optic coefficient $\sim 1.84 \times 10^{-4}$ RIU/K; $n_g$ is the nominal group index of a single-transverse mode 500 nm wide, 220 nm tall waveguide (i.e., $\sim 4.2$), and $|n_{Si}|$ the material refractive index (i.e. $\sim 3.5$); and $|\gamma_{Si}$ is the confinement factor of the mode (i.e. $\sim 0.9$ in our designs). The integrated optical PUF is simulated in three temperature settings, first at a reference temperature $|\Delta T=0°$ C., then over a wide $|\Delta T=\pm30°$ C. temperature variation. Thus, an extensive 60° C. temperature range is considered. To our knowledge, this is the first time such a wide temperature range has been considered in an optical PUF.

Figure 8A:
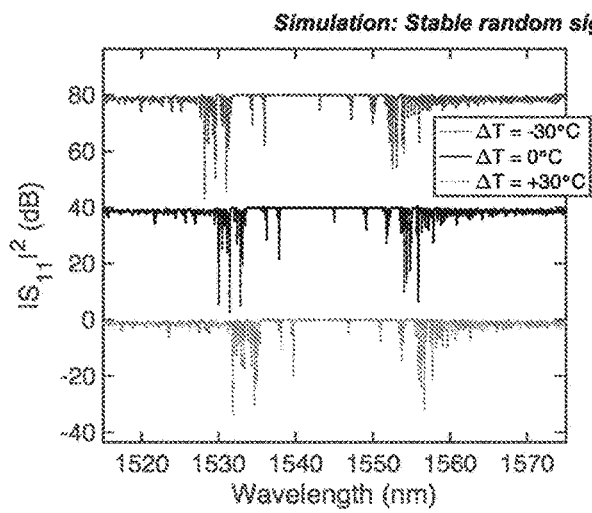
FIG. 8A illustrates graphs of simulated PUF spectra over +/−30° C. temperature variation.
Figure 8B:
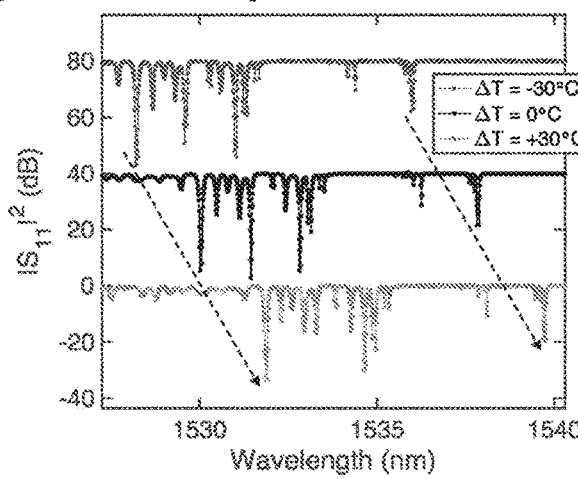
FIG. 8B is a zoomed in (enlarged) view of a portion of FIG. 8A subject matter, more clearly showing all spectral features in wavelength shift together thereby retaining the overall PUF signature (with spectra off-set on the y-axis by 40 dB for clarity)
Figure 8C:
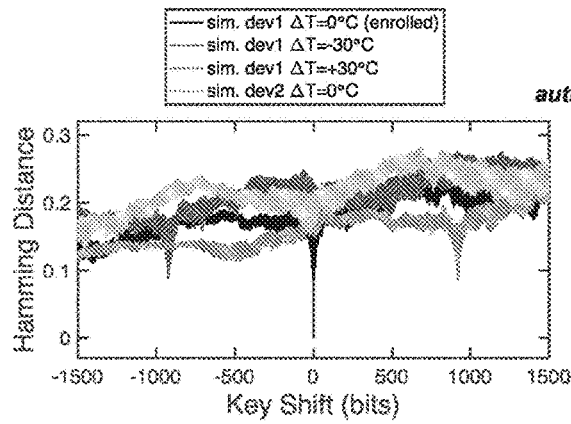
FIG. 8C illustrates a graph of simple Hamming analysis of binarized PUF spectra as a function of binary key shift.

FIGS. 8A through 8C show the spectra of our simulated PUF ("sim1") for different temperature settings. This example is well into the regime of a 'large' response, i.e., where $|\Delta\omega_n| \gg \omega_{fwhm,n}$ and $|\Delta\omega_n| \gg |\omega_{n\pm 1} - \omega_n|$. However, the spectral features of all modes are clearly observed to shift together, which is attributed to the approximately uniform confinement factor exhibited by all modes. In principle, the spectra are not perfectly shifted along the x-axis but stretched (scaled) according to the relationship of Eq. S3.5. Thus, a simple Hamming analysis which performs a binary key shift is able to achieve authentication as shown in FIG. 8C but is not nearly as robust as the wavelet-based feature extraction method we demonstrate in the table of FIG. 9B and highlight in the table of FIG. 5B.

More particularly, FIG. 8A illustrates simulated PUF spectra over +/−30° C. temperature variation, and FIG. 8B is a zoomed view thereof which clearly shows all spectral features in wavelength shift together thereby retaining the overall PUF signature. Spectra are offset on y-axis by 40 dB for clarity. FIG. 8C illustrates simple Hamming analysis of binarized PUF spectra as a function of binary key shift. While not as robust as our signature analysis (see the table of FIG. 9A), this Hamming analysis is able support of device authentication.

As otherwise noted herein, directly using the raw about signals for authentication or identification is not efficient nor robust. Here, we apply our five-level wavelet decomposition feature extraction method to the simulated PUF "sim1" spectra over temperature. The table of FIG. 9A shows the resulting features and five-level wavelet analysis. We also present the identification analysis in terms of mean squared error between the enrolled and test signals in the table of FIG. 9B. This shows the reliability of the device since the intra-chip variations are less than the inter-chip variations.

Figure 10E:
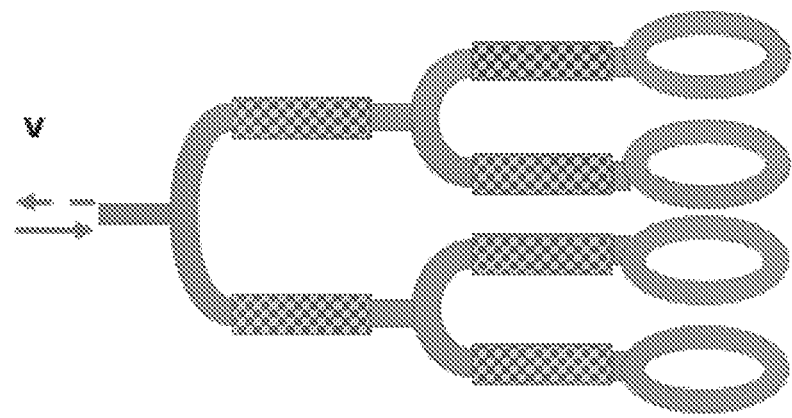
Figure 10F:
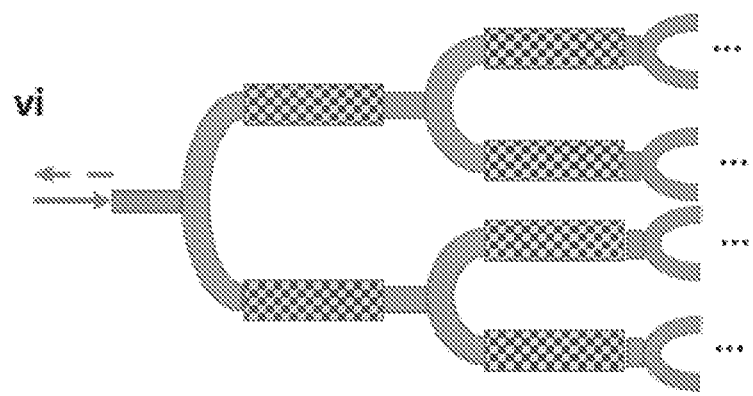
Figure 11D:
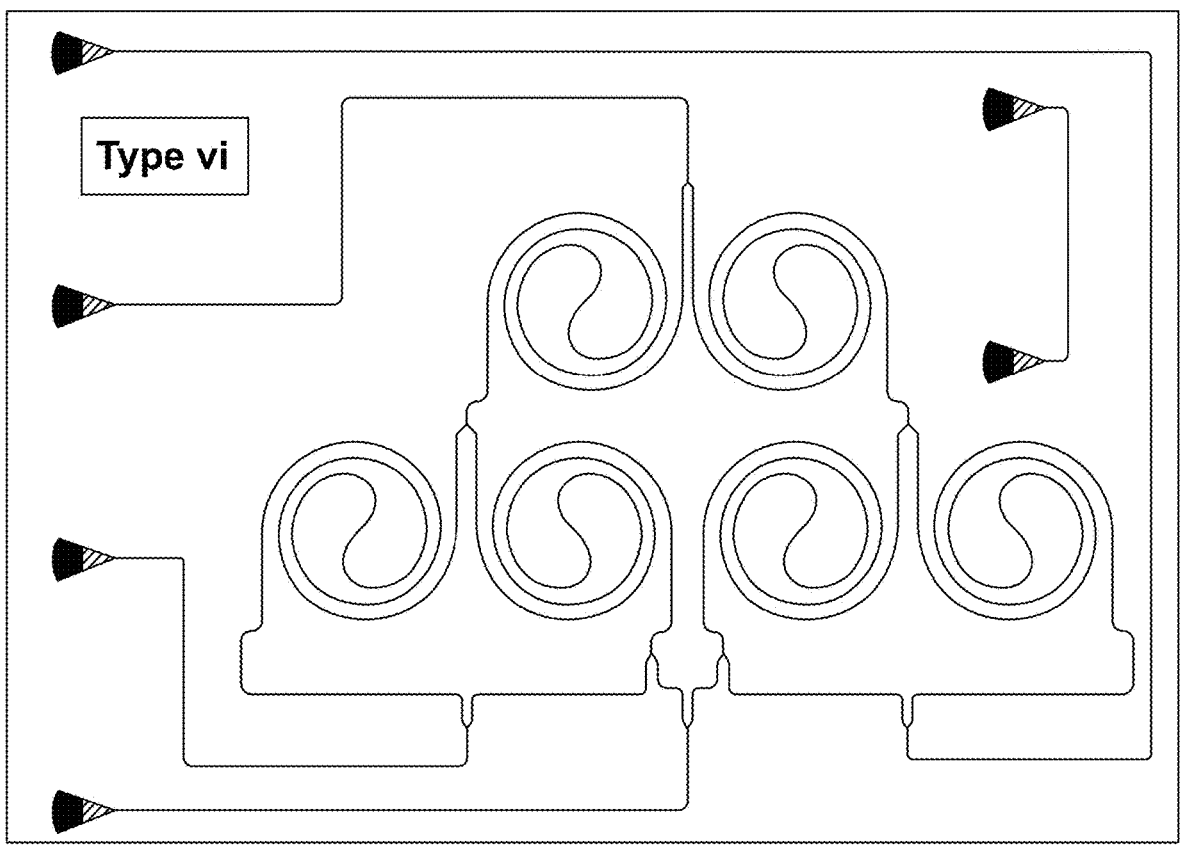

FIGS. 10A through 10F respectively illustrate diagrammatic overviews of exemplary embodiments of interferometer configurations for constructing integrated photonic PUFs in accordance with presently disclosed subject matter. These include Michaelson type (i, ii, and v, which are illustrated by FIGS. 10A, 10B, and 10E, respectively) and Mach-Zehnder type configurations (iii, iv, and vi, which are illustrated by FIGS. 10C, 10D, and 10F, respectively). The example interferometers all contain a multiple scattering element or quasicrystal (element 0), waveguides (element 1), and splitters or combiners (element 2).

The Michaelson devices may use a reflector (element 3) to provide a return path signal. To construct the device at least one interferometer arm should contain a multiple scattering element or quasicrystal. Increased spectral complexity and sensitivity to nanoscale fabrication variations can be achieved by employing more than one multiple scattering elements or quasicrystals. This complexity can be further increased by constructing a cascaded interferometer where multiple components are cascaded in series as illustrated in part v and vi. The outputs of a device of type vi can optionally be interfered together on the output side using a network of combiners.

FIGS. 11A through 11D illustrate schematic exemplary embodiments of different types of integrated photonic interferometer PUFs in accordance with presently disclosed subject matter. In particular, exemplary embodiments of type ii-, iii-, iv-, and vi-integrated photonic interferometer PUFs are represented by the schematic illustrations of FIGS. 11A, 11B, 11C, and 11D, respectively.

The example interferometers all contain a multiple scattering element or quasicrystal (element 0), which is constructed in this example from a super-periodic moiré pattern superimposed on a waveguide spiral. In this example, the varying radius of curvature of the spiral breaks the super-periodicity of the effective index moiré pattern, making the structure act as a quasi-crystal. Other elements include: single-mode waveguides (element 1), splitters or combiners (element 2), reflectors such as loop mirrors (element 3), and polarizing grating couplers (element 4).

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

REFERENCES

1. Pappu, R., Recht, B., Taylor, J. & Gershenfeld, N. Physical One-Way Functions. *Science* 297, 2026-2030 (2002).
2. Gassend, B., Clarke, D., Van Dijk, M. & Devadas, S. Silicon physical random functions. *Proc. ACM Conf. Comput. Commun. Secur.* 148-160 (2002).
3. Buchanan, J. D. R. et al. 'Fingerprinting' documents and packaging. *Nature* 436, 475 (2005).
4. Rührmair, U., Hilgers, C. & Urban, S. Optical PUFs Reloaded. *IACR Cryptol.* (2013).
5. Uchida, A. et al. Fast physical random bit generation with chaotic semiconductor lasers. *Nat. Photonics* 2, 728 (2008).
6. Pétrie, C. S. & Alvin Connelly, J. A noise-based ic random number generator for applications in Cryptography. *IEEE Trans. Circuits Syst. I Fundam. Theory Appl.* (2000). doi:10.1109/81.847868
7. Indeck, R. S. & Glavinas, E. Fingerprinting Magnetic Media. *IEEE Trans. Magn.* 29, 4095-4097 (1993).
8. Lao, Y., Yuan, B., Kim, C. H. & Parhi, K. K. Reliable PUF-Based Local Authentication With Self-Correction. *IEEE Trans. Comput. Des. Integr. Circuits Syst.* (2017). doi:10.1109/TCAD.2016.2569581
9. Prabhu, P. et al. Extracting device fingerprints from flash memory by exploiting physical variations. in *Lecture Notes in Computer Science (including subseries Lecture Notes in Artificial Intelligence and Lecture Notes in Bioinformatics)* (2011). doi:10.1007/978-3-642-21599-5_14
10. Grubel, B. C. et al. Secure communications using nonlinear silicon photonic keys. *Opt. Express* 26, 4710 (2018).
11. Di Falco, A., Mazzone, V., Cruz, A. & Fratalocchi, A. Perfect secrecy cryptography via mixing of chaotic waves in irreversible time-varying silicon chips. *Nat. Commun.* 10, 5827 (2019).
12. McGrath, T., Bagci, I. E., Wang, Z. M., Roedig, U. & Young, R. J. A PUF taxonomy. *Appl. Phys. Rev.* 6, (2019).
13. Chang, C., Zheng, Y. & Zhang, L. A Retrospective and a Look Forward: Fifteen Years of Physical Unclonable Function Advancement. *IEEE Circuits Syst. Mag.* 17, 32-62 (2017).

14. Lao, Y. & Parhi, K. K. Statistical analysis of MUX-based physical unclonable functions. *IEEE Trans. Comput. Des. Integr. Circuits Syst.* (2014). doi:10.1109/TCAD.2013.2296525
15. Bhargava, M., Cakir, C. & Mai, K. Reliability enhancement of bi-stable PUFs in 65 nm bulk CMOS. in *Proceedings of the 2012 IEEE International Symposium on Hardware-Oriented Security and Trust, HOST 2012* (2012). doi:10.1109/HST.2012.6224314
16. Cao, Y., Zhang, L., Zalivaka, S. S., Chang, C. H. & Chen, S. CMOS image sensor based physical unclonable function for coherent sensor-level authentication. *IEEE Trans. Circuits Syst. I Regul. Pap.* (2015). doi:10.1109/TCSI.2015.2476318
17. Arppe, R. & Sørensen, T. J. Physical unclonable functions generated through chemical methods for anti-counterfeiting. *Nat. Rev. Chem.* 1, 31 (2017).
18. Roberts, J. et al. Using Quantum Confinement to Uniquely Identify Devices. *Sci. Rep.* 5, 1-8 (2015).
19. Hu, Z. et al. Physically unclonable cryptographic primitives using self-Assembled carbon nanotubes. *Nat. Nanotechnol.* 11, 559-565 (2016).
20. Alharbi, A., Armstrong, D., Alharbi, S. & Shahrjerdi, D. Physically Unclonable Cryptographic Primitives by Chemical Vapor Deposition of Layered MoS2. *ACS Nano* 11, 12772-12779 (2017).
21. Smith, A. F., Patton, P. & Skrabalak, S. E. Plasmonic Nanoparticles as a Physically Unclonable Function for Responsive Anti-Counterfeit Nanofingerprints. *Adv. Funct. Mater.* 26, 1315-1321 (2016).
22. Chen, H. et al. Highly Secure Physically Unclonable Cryptographic Primitives Based on Interfacial Magnetic Anisotropy. *Nano Lett.* 18, 7211-7216 (2018).
23. Dodda, A. et al. Biological One-Way Functions for Secure Key Generation. *Adv. Theory Simulations* 2, 1800154 (2019).
24. Wiersma, D. The smallest random laser. *Nature* 406, 133-135 (2000).
25. Goorden, S. A., Horstmann, M., Mosk, A. P., Škorić, B. & Pinkse, P. W. H. Quantum-secure authentication of a physical unclonable key. *Optica* 1, 421-424 (2014).
26. Bosworth, B. T. et al. Unclonable photonic keys hardened against machine learning attacks. *APL Photonics* 5, 10803 (2020).
27. Helfmeier, C., Boit, C., Nedospasov, D. & Seifert, J.-P. Cloning physically unclonable functions. in *2013 IEEE International Symposium on Hardware-Oriented Security and Trust (HOST)* 1-6 (IEEE, 2013).
28. Rührmair, U. et al. PUF Modeling Attacks on Simulated and Silicon Data. *IEEE Trans. Inf. Forensics Secur.* 8, 1876-1891 (2013).
29. Xu, Y. et al. Mathematical Modeling Analysis of Strong Physical Unclonable Functions. *IEEE Trans. Comput. Des. Integr. Circuits Syst.* 1 (2020). doi:10.1109/TCAD.2020.2969645
30. Mesaritakis, C. et al. Physical Unclonable Function based on a Multi-Mode Optical Waveguide. *Sci. Rep.* 8, 1-12 (2018).
31. Grubel, B. C. et al. Silicon photonic physical unclonable function. *Opt. Express* 25, 12710 (2017).
32. Grubel, B. C. et al. Light transport through ultrafast chaotic micro-cavities for photonic physical unclonable functions. *2017 51st Annu. Conf. Inf. Sci. Syst. CISS 2017* 1-6 (2017). doi:10.1109/CISS.2017.7926067
33. Wiersma, D. S. The physics and applications of random lasers. *Nat. Phys.* 4, 359 (2008).
34. Kreger, S. T., Gifford, D. K., Froggatt, M. E., Soller, B. J. & Wolfe, M. S. High Resolution Distributed Strain or Temperature Measurements in Single-and Multi-mode Fiber Using Swept-Wavelength Interferometry. in *Optical Fiber Sensors* ThE42 (Optical Society of America, 2006). doi:10.1364/OFS.2006.ThE42
35. Froggatt, M. E. & Gifford, D. K. Rayleigh backscattering signatures of optical fibers—Their properties and applications. in *2013 Optical Fiber Communication Conference and Exposition and the National Fiber Optic Engineers Conference (OFC/NFOEC)* 1-3 (2013).
36. Atabaki, A. H. et al. Integrating photonics with silicon nanoelectronics for the next generation of systems on a chip. *Nature* 556, 349-354 (2018).
37. Jones, R. et al. Heterogeneously Integrated InP/Silicon Photonics: Fabricating Fully Functional Transceivers. *IEEE Nanotechnol. Mag.* 13, 17-26 (2019).
38. Torrence, C. & Compo, G. P. A Practical Guide to Wavelet Analysis. *Bull. Am. Meteorol. Soc.* (1998). doi:10.1175/1520-0477(1998)079<0061:APGTWA>2.0.CO;2
39. Phinyomark, A., Limsakul, C. & Phukpattaranont, P. Application of wavelet analysis in EMG feature extraction for pattern classification. *Meas. Sci. Rev.* (2011). doi:10.2478/v10048-011-0009-y
40. Wang, Y. et al. Focusing sub-wavelength grating couplers with low back reflections for rapid prototyping of silicon photonic circuits. *Opt. Express* 22, 20652-20662 (2014).
41. Dulkeith, E., Xia, F. N., Schares, L., Green, W. M. J. & Vlasov, Y. A. Group index and group velocity dispersion in silicon-on-insulator photonic wires. *Opt. Express* 14, 3853 (2006).
42. Davy, M. & Genack, A. Z. Selectively exciting quasinormal modes in open disordered systems. *Nat. Commun.* 9, 4714 (2018).
43. Segev, M., Silberberg, Y. & Christodoulides, D. N. Anderson localization of light. *Nat. Photonics* 7, 197-204 (2013).
44. Roati, G. et al. Anderson localization of a non-interacting Bose-Einstein condensate. *Nature* 453, 895-898 (2008).
45. Ghulinyan, M. et al. Light-pulse propagation in Fibonacci quasicrystals. *Phys. Rev. B—Condens. Matter Mater. Phys.* 71, (2005).
46. Levi, L. et al. Disorder-Enhanced Transport in Photonic Quasicrystals. *Science* 332, 1541 LP-1544 (2011).
47. Dingel, B. B. & Izutsu, M. Multifunction optical filter with a Michelson-Gires-Tournois interferometer for wavelength-division-multiplexed network system applications. *Opt. Lett.* 23, 1099-1101 (1998).
48. Simard, A. D., Painchaud, Y. & LaRochelle, S. Integrated Bragg gratings in spiral waveguides. *Opt. Express* 21, 8953-8963 (2013).
49. Wang, B., Mazoyer, S., Hugonin, J. P. & Lalanne, P. Backscattering in monomode periodic waveguides. *Phys. Rev. B* 78, 245108 (2008).
50. Grote, R. R., Driscoll, J. B. & Osgood, R. M. Integrated optical modulators and switches using coherent perfect loss. 38, 3001-3004 (2013).
51. Ryckman, J. D. Random Coherent Perfect Absorption with 2D Atomic Materials Mediated by Anderson Localization. *ACS Photonics* 5, (2018).
52. Redding, B., Fatt Liew, S., Bromberg, Y., Sarma, R. & Cao, H. Evanescently coupled multimode spiral spectrometer. *Optica* 3, 956 (2016).

53. Redding, B., Liew, S. F., Sarma, R. & Cao, H. Compact spectrometer based on a disordered photonic chip. *Nat. Photonics* 7, 746 (2013).
54. Cao, H. Lasing in random media. *Waves in Random Media* 13, R1-R39 (2003).
55. Suh, G. E. & Devadas, S. Physical unclonable functions for device authentication and secret key generation, in *Proceedings—Design Automation Conference* (2007). doi:10.1109/DAC.2007.375043
56. Herder, C., Yu, M. D., Koushanfar, F. & Devadas, S. Physical unclonable functions and applications: A tutorial. *Proceedings of the IEEE* (2014). doi:10.1109/JPROC.2014.2320516
57. Yin, C. E. & Qu, G. Temperature-aware cooperative ring oscillator puf. in 2009 *IEEE International Workshop on Hardware-Oriented Security and Trust, HOST 2009* (2009). doi:10:1109/HST.2009.5225055
58. Yang, K., Dong, Q., Blaauw, D. & Sylvester, D. A physically unclonable function with BER<$10^{-8}$ for robust chip authentication using oscillator collapse in 40 nm CMOS. in *Digest of Technical Papers—IEEE International Solid-State Circuits Conference* (2015). doi:10.1109/ISSCC.2015.7063022
59. Graps, A. An Introduction to Wavelets. *IEEE Comput. Sci. Eng.* (1995). doi:10.1109/99.388960
60. Chrostowski, L. et al. Silicon Photonic Circuit Design Using Rapid Prototyping Foundry Process Design Kits. *IEEE J. Sel. Top. Quantum Electron.* 25, 1-26 (2019).
61. M. C. Troparevsky, A. S. Sabau, A. R. Lupini, and Z. Zhang. "Transfer-matrix formalism for the calculation of optical response in multilayer systems: from coherent to incoherent interference," *Opt. Express* 18, 24715-24721 (2010).
62. A. Berk. "Variational principles for electromagnetic resonators and waveguides," *IRE Transactions on Antennas and Propagation* 4(2), 104-111 (1956).
63. Charles K. Chui. *An introduction to wavelets*, Elsevier, (2016).
64. M. Nielsen. "On the construction and frequency localization of finite orthogonal quadrature filters," *Journal of Approximation Theory*, 108(1), 36-52 (2001).

What is claimed is:

1. Methodology for secure hardware and information security applications, comprising the steps of:
   integrating a disordered photonic quasicrystal interferometer (QCI) with a single-mode filter into a silicon chip surface, for forming an optical physical unclonable function device which has an unclonable device signature, which optical physical unclonable function device is a robust device providing immunity against probing and against environmental variations; and
   determining the identification of the optical physical unclonable function device based on its unclonable device signature,
   wherein the QCI includes a waveguide structure having a non-repeating pattern along the length of the waveguide structure.

2. Methodology as in claim 1, wherein the integrating step comprises providing a robust optical device using disordered photonic integrated circuits with uniform confinement factors.

3. Methodology as in claim 1, wherein the integrating step comprises providing an integrated silicon photonic physical unclonable function based on a multiple scattering interferometer made with single-mode silicon photonic components.

4. Methodology as in claim 3, further including operating the single-mode silicon photonic components in the near infrared.

5. Methodology as in claim 1, wherein the disordered quasicrystal interferometer comprises a Michaelson or Mach-Zehnder type, wherein a multiple scattering element or quasicrystal is embedded in one or more paths of the interferometer.

6. Methodology as in claim 1, wherein the disordered quasicrystal interferometer and mode filter comprises an integrated silicon photonic quasicrystal interferometer physical unclonable function architecture.

7. Methodology as in claim 6, wherein the integrated silicon photonic quasicrystal interferometer physical unclonable function architecture comprises input/output grating couplers, single-mode waveguides, and a 50:50 directional coupler to enable pure mode filtering and stable quasicrystal interferometer device measurement in transmission.

8. Methodology as in claim 7, wherein the integrated silicon photonic quasicrystal interferometer physical unclonable function architecture further comprises a compact y-branch which splits light into two symmetric arms, routed to respective of a pair of spiral quasicrystal arms and loop mirrors.

9. Methodology as in claim 6, wherein the integrated silicon photonic quasicrystal interferometer physical unclonable function architecture is fabricated on standard 220 nm Si Photonics platform materials.

10. Methodology as in claim 1, wherein said interferometer comprises integrated silicon photonic multiple scattering interferometer physical unclonable function architecture having input/output grating couplers, single-mode waveguides, and a 2×2 coupler to enable pure mode filtering and stable multiple scattering interferometer device measurement in transmission.

11. Methodology as in claim 10, wherein said integrated silicon photonic quasicrystal interferometer physical unclonable function architecture further comprises a compact 1×2 splitter which splits light into two symmetric arms, routed to respective of a pair of spiral quasicrystal arms and loop mirrors, and said architecture is fabricated on standard 220 nm Si Photonics platform materials.

12. Methodology as in claim 1, wherein said optical hardware comprises one of Michaelson type or Mach-Zehnder type configuration interferometers, having a multiple scattering element or quasicrystal, waveguides, and splitters or combiners.

13. Methodology as in claim 12, wherein said optical hardware comprises a Michaelson device using a reflector to provide a return path signal.

14. Methodology as in claim 12, wherein said interferometer includes at least one interferometer arm containing a multiple scattering element or quasicrystal.

15. Methodology as in claim 14, wherein said interferometer includes a plurality of multiple scattering elements or quasicrystals for increased spectral complexity and sensitivity to nanoscale fabrication variations.

16. Methodology as in claim 14, wherein said interferometer comprises a cascaded interferometer with multiple components cascaded in series.

17. Methodology as in claim 16, having multiple outputs which are interfered together using a network of combiners.

18. Methodology as in claim 1, further including integrating the optical physical unclonable function device into one of silicon photonics transceivers or electronic photonic microprocessors as an optical security layer thereof.

19. Methodology as in claim 1, further including integrating the optical physical unclonable function device into one of a photonic security system-on-a-chip or optical hardware enabled encryption of communication links.

20. Methodology as in claim 1, wherein the mode filter comprises transverse electric polarization grating couplers and single-mode waveguides.

21. Methodology as in claim 1, wherein the optical physical unclonable function device includes weakly modulated single transverse mode waveguides with approximately uniform confinement factors.

22. Methodology as in claim 1, wherein the step of determining the identification includes one of application of feature extraction using wavelet analysis or Hamming distance authentication.

23. Methodology as in claim 22, wherein the feature extraction includes applying multi-level wavelet decomposition feature extraction for identification analysis.

24. Methodology as in claim 1, wherein the step of determining the identification of the optical physical unclonable function device includes determining cryptographic keys generated from the frequency response of the optical physical unclonable function device using a tunable laser and optical meter capturing device spectra.

* * * * *